United States Patent
Dvir et al.

(10) Patent No.: US 10,602,186 B2
(45) Date of Patent: *Mar. 24, 2020

(54) SYSTEMS AND METHODS FOR MASK BASED PROCESSING OF A BLOCK OF A DIGITAL IMAGE

(71) Applicant: Huawei Technologies Co., Ltd., Shenzhen, Guangdong (CN)

(72) Inventors: Itsik Dvir, Munich (DE); Natan Peterfreund, Munich (DE); Dror Irony, Munich (DE); David Drezner, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

This patent is subject to a terminal disclaimer.

(21) Appl. No.: 15/594,156

(22) Filed: May 12, 2017

(65) Prior Publication Data

US 2017/0251227 A1 Aug. 31, 2017

Related U.S. Application Data

(63) Continuation of application No. PCT/EP2014/074640, filed on Nov. 14, 2014.

(51) Int. Cl.
    *G06T 3/60*      (2006.01)
    *H04N 19/61*      (2014.01)
    (Continued)

(52) U.S. Cl.
    CPC ........... *H04N 19/61* (2014.11); *H04N 19/119* (2014.11); *H04N 19/14* (2014.11); *H04N 19/176* (2014.11);
    (Continued)

(58) Field of Classification Search
CPC .... H04N 19/61; H04N 19/625; H04N 19/593; H04N 19/119; H04N 19/196;
(Continued)

(56) References Cited

U.S. PATENT DOCUMENTS

| | | |
|---|---|---|
| 5,598,484 A | 1/1997 | Suzuki et al. |
| 5,754,698 A | 5/1998 | Suzuki et al. |

(Continued)

FOREIGN PATENT DOCUMENTS

| | | |
|---|---|---|
| CN | 101771868 A | 7/2010 |
| CN | 102215396 A | 10/2011 |

(Continued)

OTHER PUBLICATIONS

Jian-Jiun Ding et al., "Two-Dimensional Orthogonal DCT Expansion in Trapezoid and Triangular Blocks and Modified JPEG Image Compression", IEEE Transactions on Image Processing, vol. 22, No. 9, Sep. 2013, 12 pages.

(Continued)

*Primary Examiner* — Howard D Brown, Jr.
(74) *Attorney, Agent, or Firm* — Stein IP, LLC

(57) ABSTRACT

There is provided an apparatus for generating a set of transform coefficients of a block in a frame or portion thereof. The apparatus includes a media encoder coupled to a data interface configured to receive a frame or portion thereof. The media encoder is configured to: designate a rotational symmetry mask having a size and a shape as the block partitioned in the frame or portion thereof for processing the block; split the block to two complementary portions using the rotational symmetry mask; generate a pair of rotational symmetry blocks each having one of the two complementary portions; and compute a transform coefficient for each member of the pair of rotational symmetry blocks.

13 Claims, 16 Drawing Sheets

(51) Int. Cl.

| | |
|---|---|
| *H04N 19/176* | (2014.01) |
| *H04N 19/119* | (2014.01) |
| *H04N 19/196* | (2014.01) |
| *H04N 19/60* | (2014.01) |
| *H04N 19/14* | (2014.01) |
| *H04N 19/593* | (2014.01) |
| *H04N 19/625* | (2014.01) |
| *H04N 19/157* | (2014.01) |
| *H04N 19/156* | (2014.01) |
| *H04N 19/146* | (2014.01) |
| *H04N 19/172* | (2014.01) |
| *H04N 19/182* | (2014.01) |

(52) U.S. Cl.
CPC ......... *H04N 19/196* (2014.11); *H04N 19/593* (2014.11); *H04N 19/625* (2014.11); *H04N 19/649* (2014.11); *H04N 19/146* (2014.11); *H04N 19/156* (2014.11); *H04N 19/157* (2014.11); *H04N 19/172* (2014.11); *H04N 19/182* (2014.11)

(58) Field of Classification Search
CPC .... H04N 19/649; H04N 19/176; H04N 19/14; H04N 19/172; H04N 19/182; H04N 19/146; H04N 19/156; H04N 19/157; H04N 19/96; H04N 19/174; H04N 19/102; G06T 3/602
See application file for complete search history.

(56) References Cited

U.S. PATENT DOCUMENTS

| | | | |
|---|---|---|---|
| 5,886,742 A | 3/1999 | Hibi et al. | |
| 9,179,162 B2 | 11/2015 | Cook et al. | |
| 2001/0033695 A1* | 10/2001 | Okuno | H04N 19/563 382/233 |
| 2002/0051488 A1 | 5/2002 | Li | |
| 2002/0172398 A1 | 11/2002 | Hayashi | |
| 2003/0072367 A1 | 4/2003 | Okuno et al. | |
| 2006/0115922 A1 | 6/2006 | Araya et al. | |
| 2007/0263728 A1* | 11/2007 | Yanagihara | H04N 19/56 375/240.24 |
| 2008/0101707 A1* | 5/2008 | Mukherjee | H04N 19/105 382/236 |
| 2011/0097003 A1 | 4/2011 | Alshina et al. | |
| 2011/0274176 A1* | 11/2011 | Panusopone | H04N 19/50 375/240.24 |
| 2012/0014587 A1* | 1/2012 | Yamane | H04N 19/60 382/133 |
| 2012/0288210 A1* | 11/2012 | Chen | H04N 19/176 382/233 |
| 2014/0307780 A1* | 10/2014 | Cohen | H04N 19/159 375/240.03 |
| 2015/0110199 A1 | 4/2015 | Ikai et al. | |
| 2015/0229948 A1 | 8/2015 | Puri et al. | |
| 2016/0134874 A1 | 5/2016 | Konieczny et al. | |
| 2017/0201770 A1 | 7/2017 | Chen et al. | |
| 2017/0251210 A1* | 8/2017 | Dvir | H04N 19/176 |
| 2017/0251227 A1 | 8/2017 | Dvir et al. | |
| 2017/0280144 A1* | 9/2017 | Dvir | H04N 19/176 |
| 2018/0176559 A1 | 6/2018 | Lee et al. | |
| 2018/0176560 A1 | 6/2018 | Mishurovskiy et al. | |
| 2018/0199060 A1 | 7/2018 | Zheng | |

FOREIGN PATENT DOCUMENTS

| | | |
|---|---|---|
| CN | 102763415 A | 10/2012 |
| EP | 2509319 A2 | 10/2012 |
| JP | H0646397 A | 2/1994 |
| JP | H07-87493 A | 3/1995 |
| JP | 2003264833 A | 9/2003 |
| JP | 2003299100 A | 10/2003 |
| JP | 3502392 B2 | 3/2004 |
| JP | 2004297416 A | 10/2004 |
| JP | 2008109700 A | 5/2008 |
| JP | 2010508706 A | 3/2010 |
| JP | 2012089905 A | 5/2012 |
| JP | 2013512627 A | 4/2013 |
| KR | 20130025903 A | 3/2013 |
| WO | 1997028650 A1 | 8/1997 |
| WO | 2011/066672 A1 | 6/2011 |
| WO | 2011088593 A1 | 7/2011 |
| WO | 2011130186 A2 | 10/2011 |
| WO | 2013068567 A1 | 5/2013 |
| WO | 2013180023 A1 | 12/2013 |
| WO | 2014109826 A1 | 7/2014 |

OTHER PUBLICATIONS

International Telecommunication Union, "High efficiency video coding", ITU-T H.265, Oct. 2014, 540 pages.

Thomas Sikora et al., "Shape-Adaptive DCT for Generic Coding of Video", IEEE Transactions on Circuits and Systems for Video Technology, vol. 5, No. 1, Feb. 1995, 4 pages.

Gary J. Sullivan et al., "Overview of the High Efficiency Video Coding (HEVC) Standard", IEEE Transactions on Circuits and Systems for Video Technology, vol. 22, No. 12, Dec. 2012, 20 pages.

ITU-T H.264(Feb. 2014), Series H: Audiovisual and Multimedia Systems, Infrastructure of audiovisual services—Coding of moving video, Advanced video coding for generic audiovisual services, Febuary 2014. total 790 pages.

Francois E et al: CE2: Simplified Geometry Block Partitioning. Jan. 15, 2011. XP 030008270.JCTVC-D230.

Gary J Sullivan et al: Meeting report of the fourth meeting of the Joint Collaborative Team on Video Coding (JCT-VC). JCTVC-D500. Apr. 15, 2011. XP 030113312.

Mccann K et al: High Efficiency Video Coding (HEVC) Test Model 12 (HM 12) Encoder Description. JCTVC-N1002. Oct. 21, 2013. XP 030114946.

Benjamin Bross et al., High Efficiency Video Coding (HEVC) text specification draft 10 (for FDIS and Last Call), Joint Collaborative Team on Video Coding (JCT-VC) 12th Meeting: Geneva, Mar. 19, 2013, JCTVC-L1003_v34, 7 pages.

Sakae Okubo et al., H265/HEVC Textbook, Impress Japan Corporation, Oct. 21, 2013, Ver. 1, 11 pages.

* cited by examiner 16 x 16

8 x 8

SYSTEMS AND METHODS FOR MASK BASED PROCESSING OF A BLOCK OF A DIGITAL IMAGE

CROSS-REFERENCE TO RELATED APPLICATIONS

This application is a continuation of International Application No. PCT/EP2014/074640, filed on Nov. 14, 2014, the disclosure of which is hereby incorporated by reference in its entirety.

BACKGROUND

The present disclosure, in some embodiments thereof, relates to systems and methods for digital image and/or video compression and, more specifically, but not exclusively, to systems and methods for generating a set of transform coefficients for processing a block of a digital image.

Digital images, such as still images obtained by a digital camera, and digital video, require significant memory resources when stored in a non-compressed manner, represented by a full data set. Transmission of the full data set representing the digital images and/or video would require significant network resources, such as communication bandwidth. Video is especially problematic, as a single video may include thousands of individual frames. Storage and/or transmission of the full data set for each image may not be possible in many cases, or otherwise overwhelm processing and network resources.

Moreover, as quality and resolution capabilities improve in both cameras (still and video) and display screens, the amount of data generated per image continues to increase. Video based applications running on mobile devices (e.g., Smartphones and tablet computers) that rely on transmission of the video generate a large amount of network traffic, which is especially problematic for wireless networks.

Different solutions for compression of still digital images and digital video have been developed, to reduce the size of the image and video data, and thereby reduce the necessary storage resources and the network resources.

For example, Sullivan et al., "Overview of the High Efficiency Video Coding (HEVC) Standard" IEEE Transactions on Circuits and Systems for Video Technology Vol. 22, No. 12, December 2012 describe "High Efficiency Video Coding (HEVC) is currently being prepared as the newest video coding standard of the ITU-T Video Coding Experts Group and the ISO/IEC Moving Picture Experts Group. The main goal of the HEVC standardization effort is to enable significantly improved compression performance relative to existing standards—in the range of 50% bit-rate reduction for equal perceptual video quality."

SUMMARY

One object of the present disclosure is to provide an improved video compression technology.

This object is achieved by the solution provided in the independent claims. Advantageous implementations are further defined in the respective dependent claims.

According to a first aspect, an apparatus for generating a set of transform coefficients of a block in a frame or portion thereof, comprises: a media encoder coupled to a data interface adapted to receive a frame or portion thereof, the media encoder is adapted to: designate a rotational symmetry mask having a size and a shape as a the block partitioned in the frame or portion thereof for processing the block; split the block to two complementary portions using the rotational symmetry mask; generate a pair of rotational symmetry blocks each having one of the two complementary portions; and compute a transform coefficient for each member of the pair of rotational symmetry blocks.

According to a second aspect, a method for generating a set of coefficients of a block in a frame or portion thereof, comprises: designating a rotational symmetry mask having a size and a shape as a block partitioned in the frame or portion thereof for processing the block; splitting the block to two complementary portions using the rotational symmetry mask; generating a pair of rotational symmetry blocks each having one of the two complementary portions; and computing a transform coefficient for each member of the pair of rotational symmetry blocks. The method can be adapted to operate an apparatus according to the first aspect.

According to a third aspect, an apparatus adapted to decode a block in a frame or portion thereof, comprises: a media decoder coupled to a data interface adapted to receive at least one transform coefficient representing at least one member of a pair of rotational symmetry blocks, the transform coefficients coding a block in a frame or portion thereof, and a signal representing an associated designated rotation symmetry mask having a size and a shape as the block partitioned in the frame or portion thereof for processing the block; the media decoder is adapted to: compute the pair of rotational symmetry blocks based on inverse transform of the received at least one transform coefficient, each member of the pair of rotational symmetry blocks having one of two complementary portions; and reconstruct a block partitioned in same frame or portion thereof from the two complementary portions based on the rotational symmetry mask.

According to a fourth aspect, a method for reconstructing a block of a frame or portion thereof based on a set of transform coefficients, comprises: receiving a set of transform coefficients representing each member of a pair of rotational symmetry blocks, the transform coefficients represent the data of a block in the frequency domain; and a signal representing an associated designated rotation symmetry mask, the rotational symmetry mask having a size and a shape as the block partitioned in the frame or portion thereof for processing the block; computing the pair of rotational symmetry blocks based on inverse transform of the received set of transform coefficient, each member of the pair of rotational symmetry blocks having one of two complementary portions; and reconstructing the block from the two complementary portions based on the rotational symmetry mask. The method can be adapted to operate an apparatus according to the third aspect.

According to a fifth aspect a computer program is configured to perform a method according to the first aspect when executed on a computer. The computer program can be configured for use by a media encoder, the program code can comprise: instructions for designating a rotational symmetry mask having a size and a shape as a block partitioned in the frame or portion thereof for processing the block; instructions for splitting the block to two complementary portions using the rotational symmetry mask; instructions for generating a pair of rotational symmetry blocks each having one of the two complementary portions; and instructions for computing a transform coefficient for each member of the pair of rotational symmetry blocks.

According to a sixth aspect a computer program is configured to perform a method according to the fifth aspect when executed on a computer. For clarity, details of the encoding apparatus, encoding method, and/or encoding computer program product are described herein. For each described encoding function and/or structure, a corresponding decoding function and/or structure is implied. For brevity and clarity, the wording of the decoding functions and/or structural elements corresponding to the described encoding function and/or structural element are omitted. For clarify, the term media encoder also refers to the method and the computer program product. For example, the phrase the media encoder is adapted also means the method further comprises, and the computer program product further comprises instructions for.

All aspects improve system performance by improving efficiency and/or reducing resource requirements (e.g., memory and/or processor) for compression of images and/or video.

In a first possible implementation of the apparatus according to the first fifth aspect, the media encoder is adapted to generate each of the pair of rotational symmetry blocks in a size and a shape of the block by adding complementary data to the respective portion of one of the two complementary portions.

The addition of the complementary data allows processing of each respective portion as an entire block, which is processed more efficiently in block form than partial block form.

In a second possible implementation form of the apparatus according to the first aspect as such, or according to the any of the preceding implementation forms of the first aspect, the complementary data is a 2D mirror of the respective portion which the rotational symmetry block is constructed from by multiplication by one member of the group consisting of: zero (0), one (1) and minus one (−1).

In a third possible implementation form of the apparatus according to the first aspect as such, or according to the any of the preceding implementation forms of the first aspect, the media encoder is adapted to designate the rotational symmetry mask by identifying a pattern of pixel values in the block.

Designation based on the pattern of pixel values produces two complementary portions in which pixels within each respective portion are similar to one another, for example, similar intensity and/or color.

In a fourth possible implementation form of the apparatus according to the first aspect as such, or according to the any of the preceding implementation forms of the first aspect, the rotational symmetry mask is a binary mask defining a split of the block into the two complementary portions such that the shape of the block and the split are invariant under 180 degree rotation of the block with respect to a center of the block.

The binary mask provides for efficient splitting of the block into the complementary portion. Each portion includes pixels with similar characteristics, which allows for efficient processing of each portion.

In a fifth possible implementation form of the apparatus according to the first aspect as such, or according to the any of the preceding implementation forms of the first aspect, the multi-dimensional space is a two dimensional (2D) space, wherein the block is an M×N block, wherein the rotational symmetry mask is adapted to define a split of the M×N block into two complementary groups such that when a certain pixel located at (m,n) is assigned to a first group a corresponding pixel located at (M−m−1, N−n−1) is assigned to a second group.

Complex block divisions may be performed, to allow for efficient processing of each resulting complementary portion. The arbitrary block split provides for division of blocks containing non-continuous images for improved compression performance of groups having a similar property, for example, when the block includes an image of two groups having black pixels at certain locations in the block and white pixels on the 2D mirrored locations, the mask is adapted to split the image into a first group including the black pixels and a second group including the white pixels. Compression of the first group and the second group is improved by the arbitrary splitting.

In a sixth possible implementation form of the apparatus according to the first aspect as such, or according to the any of the preceding implementation forms of the first aspect, the rotational symmetry mask is adapted to define a stepwise line which splits the block into the two complementary groups, wherein the stepwise line is defined by a binary sequence, wherein each bit of the binary sequence defines a single movement step along the stepwise line, and wherein a horizontal direction is one state of the bit and a vertical direction is a second state of the bit.

The stepwise model may divide the two groups of pixels more accurately than a straight line, for example, when the two groups of pixels are separated by a complex contour, such land terrain.

In a seventh possible implementation form of the apparatus according to the first aspect as such, or according to the any of the preceding implementation forms of the first aspect, the rotational symmetry mask is adapted to define two complementary portions wherein at least one portion includes a likelihood of certain pixel characteristics above a predefined threshold value.

In an eighth possible implementation form of the apparatus according to the first aspect as such, or according to the any of the preceding implementation forms of the first aspect, the multi-dimensional space is a two dimensional (2D) space, wherein the rotational symmetry mask is adapted to define a line which joins opposing edges of the two dimensional space to split the two dimensional space to two 2D-mirrored complementary portions.

The rotational symmetry mask may be adapted to split multi-dimensional spaces and/or data, which provides for integration of the systems and/or method described herein with different image and/or video standards based on multi-dimensional space.

In a ninth possible implementation form of the apparatus according to the first aspects as such, or according to the any of the preceding implementation forms of the first aspect, the line which joins opposing edges of the two-dimensional space is discretized to an anti-symmetrical curve line that crosses the middle point of a rectangular block to split the rectangle to two mirrored complementary portions.

The curve line may divide the two groups of pixels more accurately than a straight line, for example, when the two groups of pixels are separated by a complex contour, such land terrain.

In a tenth possible implementation form of the apparatus according to the first, aspect as such, or according to any of the preceding implementation forms of the first aspect, the anti-symmetrical curve line is a discretized tilted line which joins opposing edges of the rectangular block that crosses the middle point of the rectangular block and splits the rectangle to two 2D-mirrored complementary portions.

In an eleventh possible implementation form of the apparatus according to the first aspect as such, or according to the any of the preceding implementation forms of the first aspect, the rotational symmetry mask is rectangular.

Processing rectangular blocks improves compatibility of the systems and/or methods described herein with standards that allow partitioning of the frame (or sub-areas thereof) into rectangular blocks.

In a twelfth possible implementation form of the apparatus according to the first aspect as such, or according to any of the preceding implementation forms of the first aspect, the data interface is further adapted to receive at least one transform coefficient representing at least one member of a pair of rotational symmetry blocks, the transform coefficients coding a block in a frame or portion thereof, and a signal representing an associated designated rotation symmetry mask having a size and a shape as the block partitioned in the frame or portion thereof for processing the block; and the media encoder is further adapted to: compute the pair of rotational symmetry blocks based on inverse transform of the received at least one transform coefficient, each member of the pair of rotational symmetry blocks having one of two complementary portions; and reconstruct a block partitioned in same frame or portion thereof from the two complementary portions based on the rotational symmetry mask.

In a first possible implementation form of the method according fifth aspect as such, or according to any of the preceding implementation forms of the fifth, aspect, the rotation symmetry mask is designated from a plurality of rotation symmetry masks which define a plurality of different rotational symmetries.

In a second possible implementation form of the method according to the fifth aspect as such, or according to the any of the preceding implementation forms of the fifth aspect, the designating is performed according to a pattern of pixel values in the block.

In a third possible implementation form of the method according to the fifth aspect as such, or according to the any of the preceding implementation forms of the fifth aspect, the generating is performed by adding to each member of the pair of rotational symmetry blocks complementary data added to form size and shape of the block.

In a fourth possible implementation form of the method according to the fifth aspect as such or according to any implementation form of the fifth aspect, the designating rotational symmetry mask is based on content extracted from at least one of spatial neighboring blocks of the block and temporal neighboring blocks of the block.

Optionally, the neighbors include previously processed blocks. The previously processed blocks may be used as predictors for selection of the mask for the block being currently processed.

In a fifth possible implementation form of the method according to the fifth aspect as such, or according to the any of the preceding implementation forms of the fifth aspect, the content is extracted according to a pattern of pixel values in at least one of the spatial and temporal neighboring blocks.

In an sixth possible implementation form of the method according to the fifth aspect as such, or according to the any of the preceding implementation forms of the fifth aspect, the designating rotational symmetry mask is performed based on information associated with at least one of spatial and temporal neighboring blocks of the block.

In a seventh possible implementation form of the method according to the fifth aspects as such, or according to the any of the preceding implementation forms of the fifth aspect, the information associated to at least one of spatial and temporal neighboring blocks is related to prediction.

In a eighth possible implementation form of the method according to the fifth aspect as such, or according to the any of the preceding implementation forms of the fifth aspect, the prediction is related to the direction mode of an intra predictor.

In a ninth possible implementation form of the method according to the fifth aspect as such, or according to any of the preceding implementation forms of the fifth aspect, the pattern of pixel values in at least one of the spatial and temporal neighboring blocks is related to at least one edge of pixel values.

In tenth possible implementation form of the method according to the fifth aspect as such, or according to any of the preceding implementation forms of the fifth aspect, the prediction is related to inter prediction.

In a eleventh possible implementation form of the method according to the fifth aspect as such, or according to any of the preceding implementation forms of the fifth aspect, the computing the transform coefficient is based on a 2D Discrete Orthogonal Transform which maintains the rotational symmetry condition calculated by the equation:

$$T_{p,q}(M-m-1, N-n-1) = (-1)^{(p+q)} T_{p,q}(m,n)$$

Wherein:

$\{T_{p,q}(m,n)\}$ denotes the 2D transformation basis;

(m,n) denotes the pixel location; and m=0, 1, ..., M−1; n=0, 1, ..., N−1; p and q denote the spatial frequencies: p=0, 1, ..., M−1; q=0, 1, ..., N−1.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
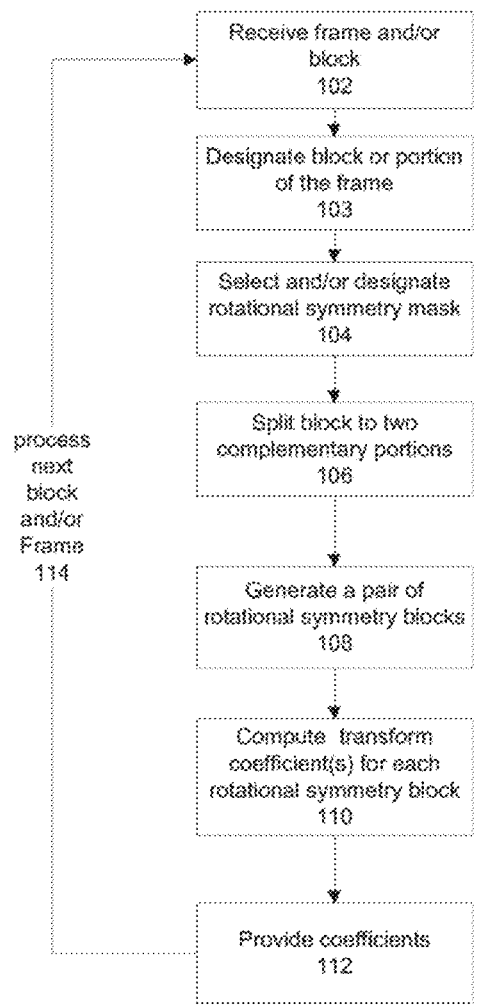
FIG. 1 is a flowchart of a method for generating a set of transform coefficients for coding and/or processing a block in a frame, in accordance with some embodiments of the present disclosure.

An aspect of some embodiments of the present disclosure relates to methods and/or systems for generating a set of transform coefficients for coding a block of a frame or portion thereof, the coding performed on two complementary portions obtained by splitting the block based on a certain selected rotational symmetry mask. The methods and/or systems reduce the size (e.g., number of bits) required to store and/or transmit the block, by improving the compression rate of the block, without a significant reduction in image quality. Any image quality reduction is within predefined acceptable limits and/or similar to image quality reduction using standard methods without the method described herein, for example, peak signal to noise ratio (PSNR) may be used as an objective measure to define image quality.

As described herein the term frame or image sometimes refers to a portion of the frame or a portion of the image. The transform coefficients may be calculated for the entire frame (and/or image), and/or for a portion of the frame (and/or image), for example, the transform coefficients are calculated for slices and/or tiles, which are sub-parts of the frame, for example, as defined by the compression standard.

The methods and/or systems include an encoder for encoding the block, by selecting a suitable rotational symmetry mask for the block, splitting the block to two complementary portions based on the mask, generating a pair of rotational symmetry blocks from each of the portions, and computing transform coefficient(s) for one or both of the rotational symmetry blocks.

The methods and/or systems include a decoder for decoding the transform coefficients and re-constructing the block. The transform coefficients are decoded to re-construct the pair of rotational symmetry blocks. Each member of the pair is converted back (for example, based on inverse transform calculations) to the respective one of the two complementary portions. The two complementary portions are connected back together to form the block, guided by the rotational symmetry mask.

For clarity, details of the encoder are described herein. For each described encoding function and/or structure, a corresponding decoding function and/or structure is implied. For brevity and clarity, the decoding functions and/or structural elements corresponding to the encoding function and/or structural element are omitted from the description.

Optionally, the mask is designated to split the block to two complementary portions that are better compressed as compared to a compression of the whole block, or as compared to compression of a standard splitting method for the block (e.g., four squares, for example, as defined the High Efficiency Video Coding (HEVC) and/or H.265 standards).

Optionally, the mask is selected to split the block based on one or more visual features within the image of the block. The block may contain different types of content separated by the visual features, for example, a tilted line or edge depicted across the block. The mask may split the block substantially along the visual feature to generate two complementary portions that are each more homogenous to one another (i.e., each generally depicting one of the types of content) than would be formed when the block is split at a location other than the visual features, for example, into four equal blocks as specified by the HEVC standard.

Optionally, different masks are selected for different blocks. The masks may be independently selected for the blocks, for example, based on the content within the block. Compression of each block is improved by the customized mask selection.

Each respective mask applied to each respective block is associated with the set of transform coefficients calculated for the respective block. For example, the mask used for each block is transmitted along with the calculated transform coefficients, and/or a signal indicating which mask (e.g., out of a library of possible masks) is associated with the transform coefficients is transmitted.

The mask has the property of being rotationally symmetric. Optionally, the mask defines the split of the block into two complementary portions such that the shape of the block and the split are invariant under 180 degree rotational of the block with respect to the center of the block. The mask may be a binary mask (as described herein). The rotational symmetry allows for calculation of orthogonal transformation coefficients in two dimensions using a suitable orthogonal transformation method, for example, a 2D discrete cosine transform (DCT). The orthogonal transformation coefficients are compressed more efficiently as compared to non-orthogonal transformation coefficients.

Each one of the two complementary portions retains the two dimensional topology of the original image content within the respective part of the block, allowing re-construction of the same image.

Optionally, the mask splits the block based on one or more features within the image of the block. The features may include a pattern of pixels within the block, for example, based on a local visual pattern, intensity values, and/or color values.

The mask may be designated based on a first group and second group of pixels, each pixel group having different classifying and/or defining values. The mask splits the block into the two complementary portions based on the respective first group and second group.

Different masks that satisfy the rotational symmetry definition may be designated. The mask may be based on a splitting linear line, which may be at any allowed angle, from 0 to 359 degrees. The mask may be based on a splitting curve, which may be based on a discretized anti-symmetrical curve line that cross the middle of the block defining the mask. The mask may split the block into the complementary portions including continuous and/or non-contiguous subareas of the block.

Optionally, the rotational symmetry mask is designated based on prediction information extracted from temporal and/or spatial blocks. The prediction may be based on mapping of an edge(s) within the temporal and/or spatial blocks. The prediction may be based on mapping of pixel patterns within the temporal and/or spatial blocks, for example, local visual features, pixel intensity and/or pixel color. The prediction may be inter-frame and/or intra-frame.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
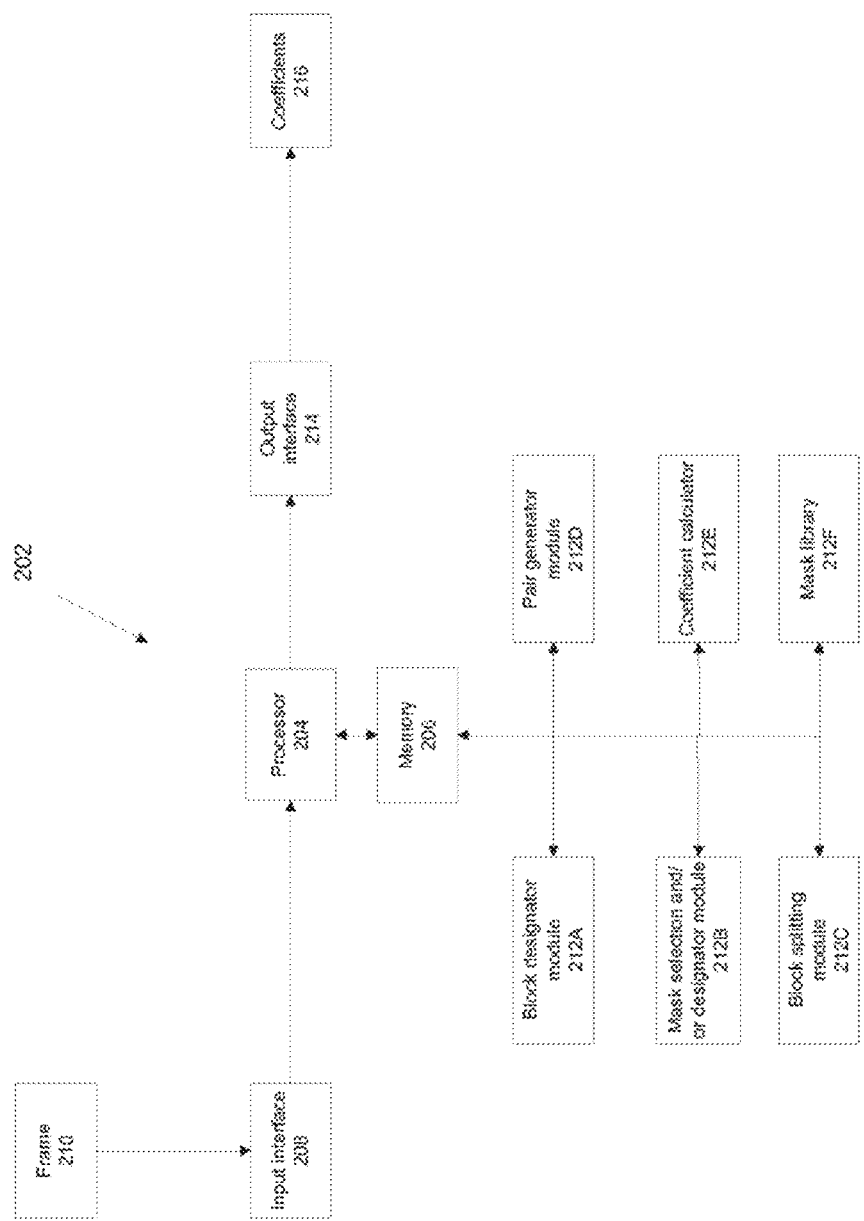
FIG. 2 is a block diagram of the transform part of a media encoder adapted to generate a set of transform coefficients for coding and/or processing a block in a frame, in accordance with some embodiments of the present disclosure.

Reference is now made to FIG. 1, which is a flowchart of a method for generating a set of transform coefficients for coding a block in a frame, in accordance with some embodiments of the present disclosure. Reference will also be made to FIG. 2, which is a block diagram of the transform part of a media encoder 202 adapted to generate a set of transform coefficients for coding a block in a frame, in accordance with some embodiments of the present disclosure. The media encoder of FIG. 2 is configured to perform one or more blocks of the method of FIG. 1. The method of FIG. 1 performed by the media encoder of FIG. 2 improve compression performance of digital images, in video and/or still format, without significantly lowering image quality, for example, as described with reference to FIGS. 12A-12I. It is noted that encoder 202 may serve as a coefficient decoder, in addition to, or instead of the described encoding functions. The decoding functions are based on the described encoding functions, but are omitted for clarity and brevity. The media encoder improves system performance by improving efficiency and/or reducing resource requirements (e.g., memory and/or processor) for compression of images and/or video.

It is noted that in the interest of clarity and brevity, media encoder 202 is described with reference to elements and/or methods for calculation of the transform coefficients (as described herein). Media encoder 202 may include and/or be in communication with other encoding components, for example, image encoder/decoder 1004 of FIG. 10.

Media encoder 202 includes one or more processors 204 in communication with one or more memories 206 (or other types of computer readable storage media) storing program instructions for execution by processors 204. Memory 206 may store data for use during processing, as described herein. Media encoder 202 may be implemented as software modules implemented within existing image compression software programs, as a chip that is integrated with existing hardware for image compression, a separate box that plugs into existing devices to improve image compression, or any combinations thereof. Processors 204 may perform the steps of the method based on parallel processing techniques, a single processor may be used, and/or processor(s) may be remotely located. Parallel processing may be used for the various candidate masks in the predefined set of rotational symmetry masks to select the best mask for splitting the block. One or more of memories 206 may be remotely located.

Media encoder 202 improves system performance by improving efficiency and/or reducing resource requirements (e.g., memory and/or processor) for compression of images and/or video.

At 102, a frame and/or block is received. Media encoder 202 is coupled to an input data interface 208 adapted to receive a frame 210 and/or block(s) of the frame. Frame 210 may be received as a still digital image, or as part of a video including multiple frames. When frame 210 is received from the video, inter-image compression techniques may be applied, as described herein.

At 103, a block or other portion of the received frame is designated. The block may be designated based on a frame division schemed, for example, based on a video and/or still image standard, for example HEVC, Moving Picture Experts Group (MPEG), and Joint Photographic Experts Group (JPEG). Alternatively or additionally, the block may be designated based on received blocks, which have been pre-divided, for example, by another encoder executing the image compression standard, for example, the partition of the frame into blocks (e.g., 16×16) is used for the encoder which uses quad tree division down to 4×4.

Optionally, media encoder 202 is adapted to designate a block partitioned in the frame. Optionally, a block designator module 212A contains program instructions for media encoder 202 to perform the designation as described herein.

The frame may be divided into multiple blocks, for example, based on a video and/or still image standard, for example HEVC, MPEG, and JPEG.

The blocks may have a standard size, for example, 64×64 pixels, 32×32 pixels, 16×16 pixels, 8×8 pixels, 4×4 pixels, or other sizes.

The blocks may be squares (L×L pixels) or rectangles (M×N pixels). Rectangles may be defined, for example, based on certain divisions of the frame, such as division of coding blocks into rectangular prediction blocks for inter-picture prediction as defined by the HEVC standard. Processing rectangular blocks improves compatibility of the systems and/or methods described herein with standards that allow partitioning of the frame (or sub-areas thereof) into rectangular blocks.

The blocks may represent luma and/or chroma data.

At 104, a rotational symmetrical mask is selected. Alternatively or additionally, the rotational symmetry mask is designated, for example, a pre-selected mask is received and designated, the rotational symmetry mask is designated based on a predefined set of rules (e.g., based on a standard), and/or based on one or more parameters described herein, for example with reference to FIG. 9.

Optionally, the mask is designated from multiple rotational symmetry masks which define multiple different rotational symmetries, for example, from a library or libraries of masks.

Optionally, a mask selector and/or designator module 212B contains program instructions for media encoder 202 to perform the mask selection and/or mask designation as described herein.

Optionally, the rotational symmetry mask has a rotational symmetry of order 2 (named here as C2, since the rotational symmetry holds for 360/2=180 degrees) with respect to the center of the block of the mask.

Figure 3:
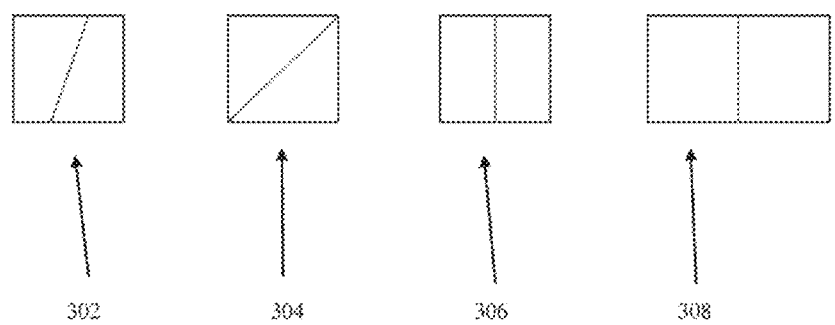
FIG. 3 is a schematic diagram depicting some examples of simple rotational symmetry masks, in accordance with some embodiments of the present disclosure.

Reference is now made to FIG. 3, which depicts schematic diagrams of some examples of rotational symmetry masks, in accordance with some embodiments of the present disclosure, for example, a right angle trapezoid 302, a right angle triangle 304, a rectangle 306 and a square 308.

Referring now back to FIG. 1, the media encoder is adapted to select a rotational symmetry mask for the designated block from multiple rotational symmetry masks which define multiple different rotational symmetries in a multi-dimensional space having a size and a shape as the block.

Figure 4:
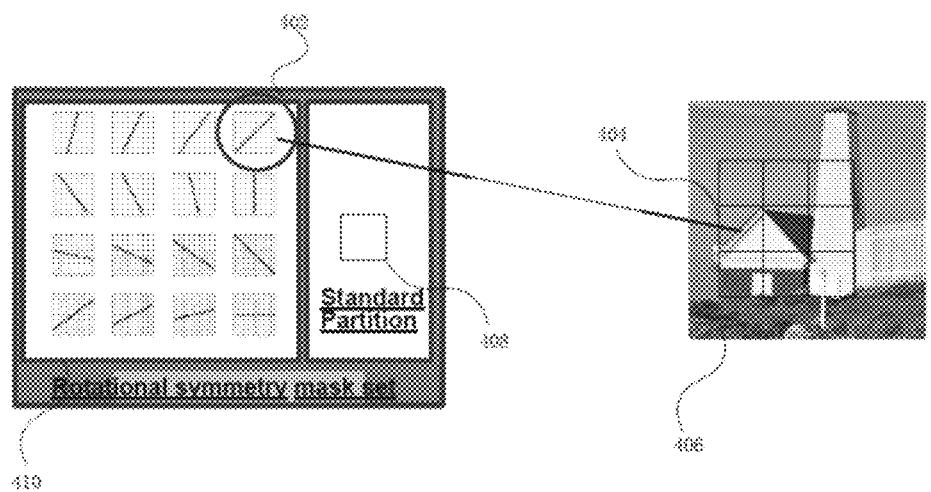
FIG. 4 is a schematic diagram depicting selection of a rotational symmetry mask for a block, in accordance with some embodiments of the present disclosure.

Reference is now made to FIG. 4, which is a schematic diagram depicting selection of a certain rotational symmetry mask 402 for a block 404 within a frame 406, in accordance with some embodiments of the present disclosure. Frame 406 contains an image of a house. Block 404 contains a portion of the roof of the house, and another portion of sky. Mask 402 is selected from a set of multiple available masks 410, based on certain compression preference measure (e.g., rate-distortion) and/or the visual feature boundary and/or edge that best separates the sky from the house. As apparent upon visual inspection of the non-selected masks, application of any of the other masks would result in more sky being contained within the roof portion, and more roof contained within the sky portion, as compared to using mask 402. Division of block 404 by mask 402 improves image compression as compared to compression of the entire block 404 by a standard partition 408 or by another mask.

Referring now back to FIG. 2, the rotational symmetry mask may be selected from multiple masks stored in a rotational symmetry masks library 212F, optionally stored on memory 206 and stored on another computer readable storage medium in communication with processor 204.

Library 212F may store multiple different libraries of rotational symmetry masks. Each library may be based on a size and/or a shape of the block. For example, one library for masks of blocks of size 16×16 pixels, and another library for blocks of size 8×8 pixels.

Optionally, the different rotational symmetry masks are square masks (i.e., L×L pixels) having a size and a shape as the block. Alternatively, the different rotational symmetry masks are rectangular masks (i.e., M×N pixels) having a size and a shape as the block.

The rotational symmetry mask is adapted to define a line which joins opposing edges of a rectangle or square, to split a corresponding rectangular or square block to two 2D mirrored complementary portions. Different lines may be defined based on the two dimensional mirroring condition. The line may be linear or other forms, for example, stair step or other arbitrary shapes. The line may be tilted at any angle or part thereof from 0 to 359 degrees. The 2D mirror property provides efficient compression of the block.

Optionally, the rotational symmetry mask is adapted to define a split of the block of size M×N into two complementary groups based on the condition that a certain pixel located at (m,n) is assigned to a first group, and a corresponding pixel located at (M−m−1, N−n−1) is assigned to a second group. The split may be arbitrary. A group may be continuous (or contiguous) or dis-continuous (or dis-contiguous), with the split being formed by a line, as described herein. Alternatively, each group may be formed as discontinuous (or dis-contiguous) regions, as described herein. The arbitrary block split provides for division of blocks containing non-continuous images for improved compression performance of groups having a similar property, for example, when the block includes an image of two groups having black pixels at certain locations in the block and white pixels on the 2D mirrored locations, the mask is adapted to split the image into a first group including the black pixels and a second group including the white pixels. Compression of the first group and the second group is improved by the arbitrary splitting.

Optionally, the split into the first and second group is based on pixel characteristics. The first group of pixels includes values with a first pixel characteristic and the second group of pixels includes values with a second pixel characteristic. The pixel characteristics may be selected based on properties of the image that are best suited for splitting of the block for improved compression.

Optionally, the rotational symmetry mask is adapted to define two complementary portions wherein one or more portions include a likelihood of certain pixel characteristics above a predefined threshold value. For example, pixels above a certain intensity threshold, pixels having a certain color, and/or local pixel statistical patterns. The predefined threshold value may be selected, for example, based on a histogram being narrow or almost flat in one or more portions, and/or the majority of pixels in the portion having a low correlation (e.g., below a predefined threshold) to the immediate neighborhood of pixels (which represents a noisy area).

Optionally, the rotational symmetry mask is adapted to define a stepwise model separating between the first group of pixels having values with the first pixel characteristic and the second group of pixels having values with the second pixel characteristic. The stepwise model may divide the two groups of pixels more accurately than a straight line, for example, when the two groups of pixels are separated by a complex contour, such land terrain.

The stepwise line may be defined by a binary sequence. Each bit of the binary sequence defines a single movement step along the stepwise line, where a horizontal direction is one state of the bit (e.g., 0 or 1) and a vertical direction is a second different state of the bit, for example, as illustrated and described with reference to FIG. 8.

As described herein, the pixel characteristics defining the first and second group may be related to one or more of: pixel color, pixel intensity, local pixel pattern. For example, the first group of pixels may include mostly a red color, and the second group of pixels mostly a blue color. Or in another example, the first groups of pixels may include high intensity pixels and the second group low intensity pixels, the high and low intensity defined based on a threshold. The location of the stepwise division between the groups may be selected, for example, as a best fit line separating the two pixel characteristics, while satisfying the mirror requirement.

Optionally, the rotational symmetry mask is adapted to define a line, a plane, or other higher dimensional surface, which joins opposing edges of a multi-dimensional space to split the multi-dimensional space to two mirrored complementary portions. The block being split may include multi-dimensional image data, for example, three dimensional (3D) image data, or four dimensional (4D) data. The 3D or 4D image data within the block may be split based on the multi-dimensional rotational symmetry mask. Alternatively or additionally, the block being split defines 2D image data, which is represented in higher dimensions, for example, based on color and/or intensity space of the pixels. The rotational symmetry mask may be adapted to split multi-dimensional spaces and/or data, which provides for integration of the systems and/or method described herein with different image and/or video standards based on multi-dimensional space.

Figure 5A:
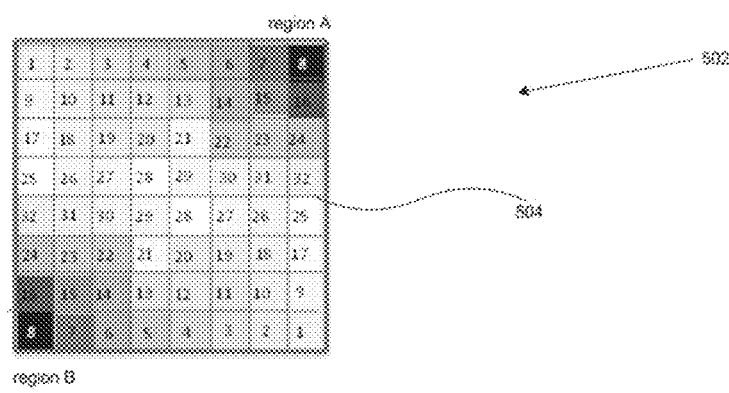
FIGS. 5A-5C are schematic diagrams depicting pixel 2D mirroring for defining the rotational symmetry masks, in accordance with some embodiments of the present disclosure.
Figure 5B:
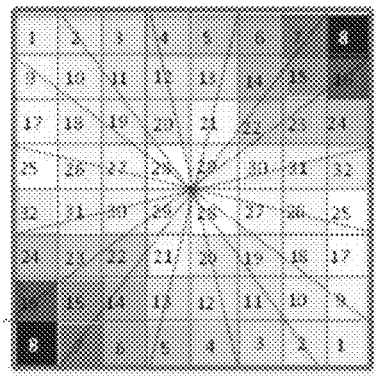
Figure 5C:
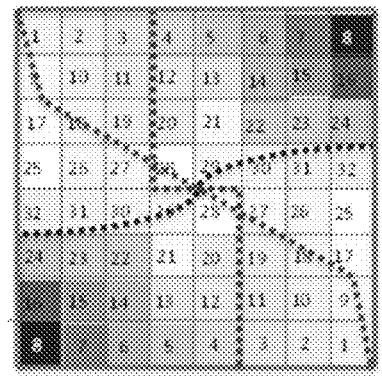

Reference is now made to FIGS. 5A-5C which are schematic diagrams depicting pixel 2D mirroring for defining the rotational symmetry masks, in accordance with some embodiments of the present disclosure.

FIG. 5A depicts the general 2D mirror concept. A block 502 of size 8 pixels by 8 pixels is shown for example purposes. Regions A and region B are separated by a virtual line 504 positioned horizontally through the middle of block 502. Pixels having the same number in region A and region B are 2D mirrors of one another. Pixel 2D mirroring may be generalized for an M×N rectangle: when pixel (m, n) is in region A, then pixel (M−1−m, N−1−n) is in region B.

It is understood that the 2D mirror concept may be applied to other square or rectangular blocks of different sizes. It is understood that the 2D mirror concept may be depicted for other virtual lines drawn at different tilts, for example, vertically, where region A and B are defined and separated by a virtual line positioned vertically through the middle of block 502.

Multiple different lines which join opposing edges of block 502 and cross the center point of block 502 are adapted to form a rotational symmetry mask library, as depicted in FIGS. 5B and 5C. Each individual line defines an individual mask. Each line splits block 502 into two complementary portions: region A and region B.

Optionally, the different rotational symmetry masks are defined by a respective matrix (e.g., each pixel position is represented by a location in the matrix). Each matrix defines a different separation of regions A and B, for example a line which joins opposing edges of the two dimensional space, to split the two dimensional space to two complementary portions.

It is noted that when the line goes through a location of a sample, there is no need for sub-sampling, since the full sample may be assigned to region A and be removed from region B. The computation resources (e.g., processor and/or memory) may be reduced by the addition to region A and removal from region B, instead of, for example, performing the complete set of calculations for each respective region.

Figure 5D:
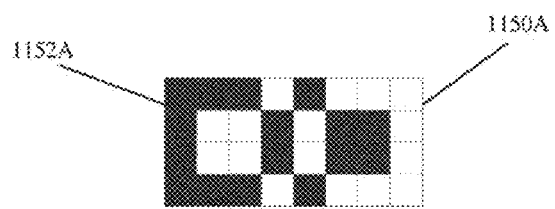
FIGS. 5D-5E are schematic diagrams depicting examples of arbitrary rotationally symmetry masks, in accordance with some embodiments of the present disclosure.
Figure 5E:
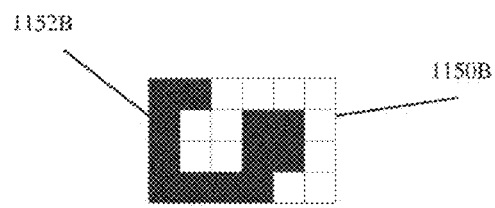

Reference is now made to FIGS. 5D-5E, which are schematic diagrams depicting examples of arbitrary rotationally symmetric masks, in accordance with some embodiments of the present disclosure. The mask may be defined in a certain combination that satisfies the 2D mirror property described herein.

Each mask is divided into two different regions. Region A (1150A for FIG. 5D and 1550B for FIG. 5E) is depicted by white sub-regions (e.g., pixels). Region B (1152A for FIG. 5D and 1552B for FIG. 5E) is depicted by black sub-regions (e.g., pixels). The sub-regions forming region A are not necessarily connected to each other. The sub-regions forming region B are not necessarily connected to each other. Sub-regions from A and B may be interlaced with each other. Pixels of region A may be located between pixels of region B which separate the pixels of region A. Pixels of region B may be located between pixels of region A which separate the pixels of region B. Complex block divisions may be performed, to allow for efficient processing of each resulting complementary portion.

Optionally, the rotational symmetry mask is a binary mask, in which each pixel (or other sub-region division) is assigned one out of two possible values. The binary values define a rotational symmetry between a first group of pixels (e.g., region A) having values with a first pixel characteristic (e.g., white or 1) and a second group of pixels (e.g., region B) having values with a second pixel characteristic (e.g., black or 0). One or more members (e.g., pixels or other sub-regions) of the first group may be located between two or more members of the second group. The binary mask provides for efficient splitting of the block into the complementary portion. Each portion includes pixels with similar characteristics, which allows for efficient processing of each portion.

Figure 6A:
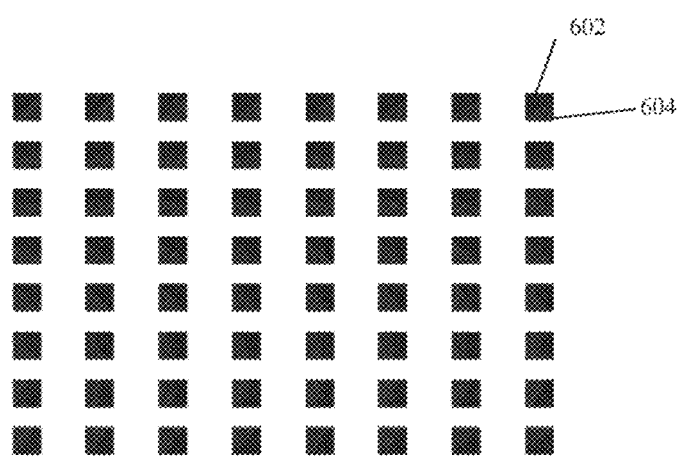
FIGS. 6A-6D are some examples of rotational symmetry mask libraries, in accordance with some embodiments of the present disclosure.
Figure 6B:
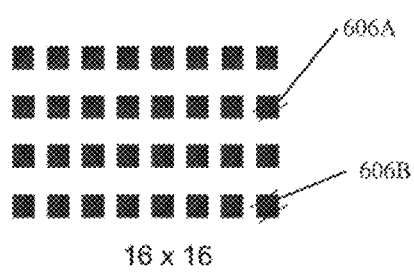
Figure 6C:
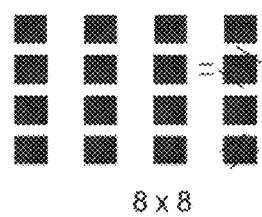
Figure 6D:
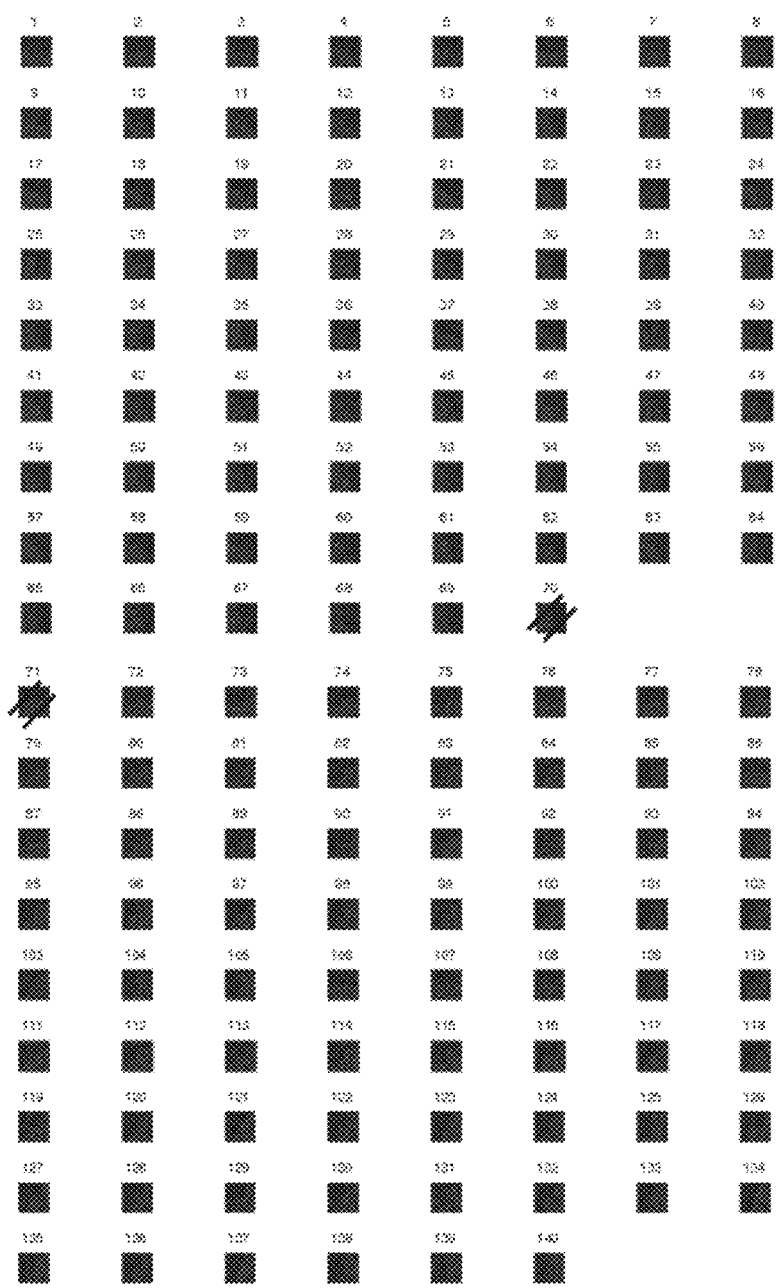

Reference is now made to FIGS. 6A-6D, which are some examples of rotational symmetry mask libraries, in accordance with some embodiments of the present disclosure. FIG. 6A is an example of a library of masks for splitting a block of size 32×32 pixels. FIG. 6B is an example of a library of masks for splitting a block of size 16×16 pixels. FIGS. 6C and 6D are examples of libraries of masks for splitting a block of size 8×8.

The rotational symmetry mask libraries of FIGS. 6A-6C are based on a tilted line, which splits the block into two trapezoidal regions, represented by a dark region 602 of the mask (e.g., blue) and a light region (604) of the mask (e.g., red). Each mark in the library has a slightly different tilt of the line. Together, all the masks define all the different permutations of the tilted line within the block. Based on the tilted line cut, there are 2×(L−1) different ways to partition the square of size L×L.

In FIG. 6B, masks 606A and 606B have parallel lines through them, representing removal of masks 606A and 606B from the set of 32 masks, to form the set of 30 masks based on the equation in the previous paragraph. The two masks are doubles of existing masks due to mirror symmetry, and therefore may be removed from the generated set. Similarly, in FIG. 6C, two double masks are shown with parallel lines, representing the removal of the redundant masks from the set.

FIG. 6D is an example of a library of masks for splitting an 8×8 block, based on a stair step pattern that passes through the center of the block. The stair step pattern is represented as a discretization of a curved cut, for example, including the mask lines shown with reference to FIGS. 5B and 5C. 138 different rotationally symmetrical masks are depicted, representing all the permutations available for generating the stair step pattern for splitting the block into two complementary portions. It is noted that masks 70 and 71 which are doubles are deleted from the total of 140 possible masks. It is noted that the set of tilted line based masks depicted in FIG. 6C are a subset of the masks based on the stair step pattern of FIG. 6D.

Optionally, as exemplified in FIG. 6D, the line which joins opposing edges of a multi-dimensional space is discretized to an anti-symmetrical curve line that crosses the middle point of a rectangular (or square) block to split the rectangle (or square) to two mirrored complementary portions. The anti-symmetrical curve line may be a discretized tilted line which joins opposing edges of the rectangular (or square) block that crosses the middle point of the rectangular (or square) block and splits the rectangle to two mirrored complementary portions. The discretization of the line is performed for representation based on the pixels, which represent discrete values.

Optionally, each of the different rotational symmetry masks (which may be stored as one or more libraries) is mapped in a hierarchal arrangement. The hierarchal arrangement may reduce the processing time and/or resources to identify the best mask.

Each library may be independently mapped, the masks of each respective library may be mapped in the hierarchal arrangement. Alternatively, one or more libraries are mapped together based on the same hierarchal arrangement. The masks within each library are mapped based on the same common hierarchal arrangement.

The set of masks is divided into separate disjointed sections. The hierarchical arrangement may be according to an angle of the line in relation to an edge of the two dimensional space, for example, a hierarchal arrangement may map the lines of FIG. 6A-6D, for example, into group of 0-60 degrees, 61-120 degrees, and 121-180 degrees. The hierarchal arrangement may continue for mapping 181-240 degrees, 241-300 degrees, and 301-360 degrees, when the line is symmetrical and/or non-symmetrical. The hierarchal arrangement may be layered, for example, the group of 0-60 degrees is further sub-divided into the groups 0-15, 16-30, 31-45, and 46-60 degrees.

Selection of a certain mask library from multiple libraries, and/or selection of a sub-set of mask(s) from a mask library may improve system performance, for example, by reducing signaling overhead (e.g., reduce the number of encoded bits used to signal to a decoder the selected mask), processor resource utilization (e.g., by reducing computation complexity) and/or memory requirements.

The mask subset and/or certain mask library may be selected based on content in the block (which may be performed in a pre-processing step). For example, the direction and/or angle of an edge and/or a border in the image may be detected. Masks having angles within a range around the identified edge angle (e.g., based on a closeness threshold) may be identified to serve as the sub-set, out of which the certain mask is selected from.

Previously encoded rotational symmetry blocks (individual members or both members of the pair) may be identified to serve as predictors for the block being processed. The rotational symmetry blocks may be identified within the same frame (i.e., intra-image), and/or within other frames of the video (i.e., inter-frame). The rotational symmetry blocks may be identified based on a spatial and/or temporal relationship to the block being processed. The prediction blocks may be used to select the sub-set of masks.

The identified pixel pattern of the content of the block and/or the predictors may be used to lower the size of the set of masks from which the applied mask is selected. The smaller set size may lead to an improvement of system performance.

Figure 7:
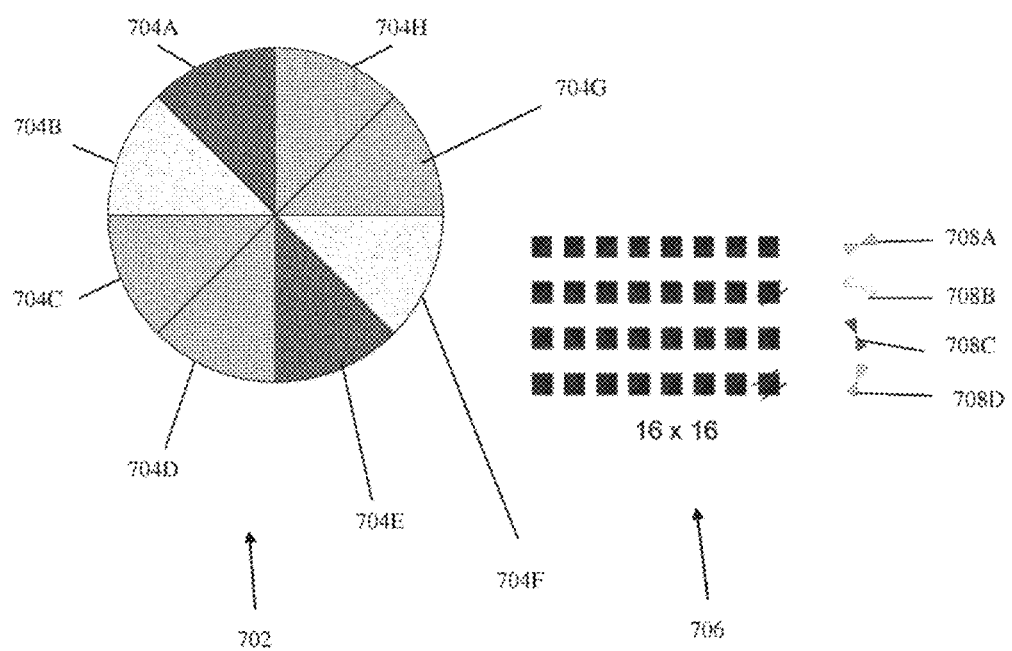
FIG. 7 is a schematic diagram that graphically depicts the hierarchal arrangement of rotational symmetry masks, in accordance with some embodiments of the present disclosure.

Reference is now made to FIG. 7 which is a schematic diagram that graphically depicts the hierarchal arrangement, in accordance with some embodiments of the present disclosure.

Divided circle 702 graphically depicts an example of a hierarchal arrangement for a mask library 706. Library 706 includes tilted line masks for a block of size 16×16, as described with reference to FIG. 6B. Circle 702 is divided into regions 704A-H, each representing 45 degrees of line tilt. The hierarchal arrangement is simplified due to the symmetrical nature of the tilted line masks, grouping together sectors 704A with 704E (shown as sectors 708C), 704B with 704F (shown as sectors 708B), 704C with 704G (shown as sectors 708A), and 704D with 704H (shown as sectors 708D). Each sector 708A-D includes 8 or 7 masks with line tilt angles falling within the respective angle range.

Optionally, the media encoder is adapted to select the rotational symmetry mask in an iterative mask selection of at least some of the different rotational symmetry masks in an order defined according to the hierarchal arrangement. For example, referring to FIG. 7, the search is performed among the representative partitions 708A-D having a central angle defined by the equation 22.5+45 k, where k=0, 1, 2, 3, and a span of 45 degrees. The section may be selected based on a lowest cost calculated by a suitable function, for example, a minimum rate distortion measure. The mask within the selected section may be selected in a similar manner. When the hierarchal arrangement includes additional levels, the additional levels may be searched in an iterative manner until a mask is identified.

Figure 8:
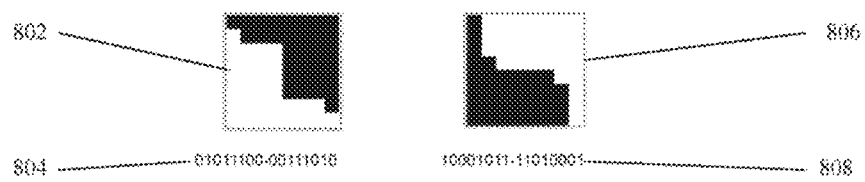
FIG. 8 is a schematic diagram depicting generation and/or representation of the rotational symmetry mask, in accordance with some embodiments of the present disclosure.

Reference is now made to FIG. 8, which is a schematic depicting generation and/or representation of the rotational symmetry mask, in accordance with some embodiments of the present disclosure. Optionally, a library of masks is generated, based on different permutations within the block containing the mask.

For example purposes, mask generation for blocks of size LxL is described, which may be extended to the M×N case. The mask may be generated starting from the upper left corner, proceeding towards the center of the block. The combination of movements may be 2D mirrored to obtain the remaining mask pattern from the center of the block to the bottom right.

The mask may be represented by a binary representation for each move. Each move is either horizontal (i.e., from left to right) or vertical (i.e., from top to bottom), represented by a 1 (e.g., one step to the right) or 0 (e.g., one step down). The binary mask representation may be transmitted as is, or be further compressed. The binary representation provides an efficient (i.e., in terms of processor and/or memory resource utilization) transmission of the mask, for example, from the encoder to the decoder.

Each permutation in the set may be defined by a total of 2×L moves.

Mask 802 is represented by binary pattern 804. Mask 806 is represented by binary pattern 808.

Figure 9:
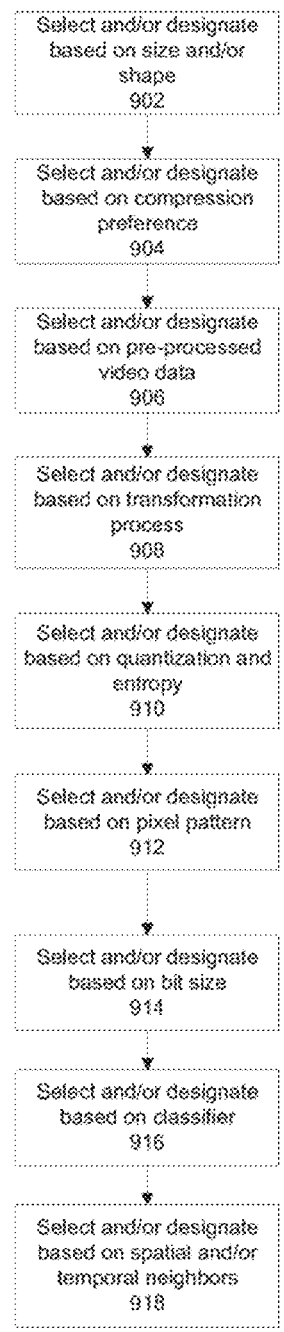
FIG. 9 is a list of varieties of computerized criteria and/or methods for selecting and/or designating a rotational symmetry mask for splitting the block, in accordance with some embodiments of the present disclosure.

Reference is now made to FIG. 9, which is a list (e.g., flowchart) of computerized methods for selecting and/or for designating a rotational symmetry mask and/or mask library for splitting the block, in accordance with some embodiments of the present disclosure. The mask and/or mask library may be generated (e.g., in advance and/or dynamically) based on the blocks, instead of and/or in addition to being selected. Media encoder 202 is adapted to perform one or more blocks of the method. One or more blocks of the method may be performed for mask selection. Blocks may be performed in any order and/or simultaneously.

The one or more methods of selection described herein (executed sequentially and/or in parallel, optionally in combination) may be used as a basis for selection of a certain mask within a library of masks. Alternatively or additionally, the methods of selection may be used to first select a certain mask library out of multiple mask libraries, and/or a sub-set of masks out of the library. The certain mask may be selected out of the selected library and/or selected sub-set. The step-wise and/or hierarchical selection may reduce the search range, by reducing the size of the set for selection at each step, reducing resources and/or the computations for the selection.

The selection of the mask from a library (or mask subset) instead of from a larger set of candidate masks reduces the number of encoded bits which are used to signal to a decoder the selected mask, and/or reduce the computation complexity and/or the memory sources and/or processor resources.

Optionally, at 902, the library and/or the mask is selected and/or designated based on the size and/or shape of the block. The mask may be selected from within the selected library as described herein.

Alternatively or additionally, at 904, the media encoder is adapted to select and/or designate the rotational mask and/or rotational symmetry mask library from multiple rotational symmetry masks and/or mask libraries based on compression preference for any one or more of, but not necessarily limited to, the following list: block, slice, tile, frame, and sequence.

The compression preference includes one or more parameters that define compression performance of the block when a certain mask is applied. The compression preference may be defined per mask and/or per mask library.

The compression preference may be estimated, for example, based on previously collected statistical data for the mask and/or library. Alternatively, the compression preference may be calculated, for example, by applying one or more of the candidate masks to the block.

Compression preferences may help in mask selection when compression parameters involve certain tradeoffs, for example, a decrease in size at the expense of decrease in quality.

The compression preference is selected from one or more of the following, individually or in combination:

Compression complexity preference: a measure that relates to processing resources for performing the compression based on the mask, for example, the number of computations, processor resources and/or memory resources. The measure may be dependent on the specific computer executing the method;

Compression quality preference (e.g., image distortion): compression based on the mask is a lossy operation, resulting in lower visual quality of the block. The lower quality may or may not be visually discernible by a human eye. The compression quality preference may be determined based on a measure related to the loss of information due to the compression based on the mask, for example, peak signal to noise ratio (PSNR) and/or structural similarity (SSIM); and Compression size preference: the size (e.g., number of bits) of the block after compression based on the selected mask.

Optionally, the media encoder is adapted to automatically generate the rotational symmetry mask library according to a member of a group consisting of preferences for: a block compression complexity, a block compression size, and a block compression quality. The generated mask library has known compression preference criteria, which allows for easy and/or fast selection of the library. The number of masks within the generated library may be smaller than generating all possible permutations, as only masks satisfying the compression criteria are included.

Each mask may be associated with the compression preference, for example, stored, matched, and/or tagged with the compression preference values. Each mask may be associated with one or more measures to calculate the compression complexity preference, the compression quality preference, and/or the compression size preference.

Optionally, each one of the different rotational symmetry masks is associated with an estimated complexity measure indicative of a computational complexity of applying the respective mask on an exemplary block having the size and the shape of the respective mask. Masks with lower estimated complexity measures are estimated to require fewer resources (e.g., processor and/or memory). Mask selection based on estimated outcome improves system efficiency and/or utilizes fewer resources.

Optionally, each one of the different rotational symmetry masks is associated with an estimated distortion measure indicative of a compression distortion level emanated from applying the respective mask on an exemplary block having the size and the shape of the respective mask. The estimated distortion measure helps in selecting the mask based on the lossy compression tradeoff, for example, to select the mask having visually indistinguishable compression distortion level that also produces higher compression of the image. Masks with lower estimated distortion measures are estimated to require fewer resources (e.g., processor and/or memory) while achieving the targeted compression distortion level.

Optionally, the media encoder is adapted to select a rotational symmetry mask based on compression preference for the block. Optionally, the compression preference is selected from one or more of: a compression complexity preference, a compression quality preference, and a compression size preference.

Alternatively or additionally, at 906, the mask selection and/or designation is based on pre-processed video data that includes the received frame. The pre-processing of the video data may be performed by the media encoder, by another computer connected to the media encoder, or by another computer independent of the media encoder (e.g., remotely located). The pre-processed data may be transmitted to the media encoder independently of the frame, and/or with the frame (e.g., tagged to the frame).

The pre-processing may be based on one or more identified features of the content of the frames of the video, for example, statistical distribution of pixel patterns, edges, pixel intensity, and pixel colors. The video data may be pre-classified based on the pre-processing results. The classification may be based on the identified features for allowing selection of the mask and/or mask library. The pre-classified video data improves system performance, as the masks may be selected more efficiently and/or using less resources based on the classification.

Optionally, the media encoder is adapted to select the rotational symmetry mask and/or mask library from multiple candidate rotational symmetry masks and/or mask libraries, based on the classification of the video data. For example, the pre-processing may identify that the video contains frames having many straight lines, for example, images of houses, cars, or other artificial structures. The video data may be classified as containing straight lines. A mask library of straight lines (i.e., different angles) may be selected. In another example, the pre-processing may identify that the video contains frames having many curved lines, for example, images of tree, branches, and land terrain. The video data may be classified as containing curved lines. A mask library of curved lines (i.e., stair step lines based on discretization of curves may be selected).

The pre-processing of content may provide information for encoding based on prediction, as described herein.

Optionally, the media encoder is adapted to automatically generate the rotational symmetry mask and/or mask library based on the preprocessed video data. The different rotational symmetry masks may be selected from the mask repository of different rotational symmetry masks according to one or more compression parameters: an outcome of the preprocessing for compression complexity preference, compression size preference and/or compression quality preference. The compression parameters may be pre-calculated from the video data.

The pre-processing of the video data may improve performance of the encoder. Resource heavy computations may be performed in advance, instead of during the compression. Data serving as the basis for mask selection may be ready, to allow for faster mask selection during the block compression process, instead of performing the mask selection calculation during the compression process.

Alternatively or additionally, at 908, the media encoder is adapted to select and/or designate the rotational symmetry mask based on an outcome of a transformation process and/or an estimation of an outcome of a transformation process applied on the at least one of the two complementary portions. Mask selection based on outcome and/or estimated outcome improves system efficiency and/or utilizes fewer resources.

The outcome of transformation process may include the size (e.g., number and/or sum of absolute of transform coefficients which are above a certain threshold) of one or both of the complementary portions after the transformation process. The mask resulting in the smallest size of the portion after the transformation process may be selected. The size may be calculated for one or both portions, such as the sum of the size of both portions.

The estimation of an outcome of a transformation process may include the Sum of Absolute Difference (SAD) of the residual data which is the input to the transformation process.

The estimation of the outcome of a transformation process may include the sum of absolute of the first, the second, and/or the higher order derivatives along the horizontal and/or vertical directions of the residual data.

The estimation may be based on values from previously encoded portions using the same mask.

The outcome of the transformation process may be estimated by a known transformation process, for example, the transformation process(es) defined by the compression standard.

Alternatively or additionally, at 910, the media encoder is adapted to select and/or designate the rotational symmetry mask based on an outcome and/or an estimation of an outcome of a quantization process and/or an entropy coding process applied on the transform coefficients for at least one member of the pair of rotational symmetry blocks.

The mask resulting in the smallest size of the portion after the quantization and/or entropy coding process may be selected, for example, the number of non-zero coefficients after quantization, and/or the size in generated bits, respectively. The size may be calculated for one or both portions, such as the sum of the size of both portions.

The estimation may be based on values from previously quantized and/or entropy coded portions using the same mask.

Alternatively or additionally, at 912, the media encoder is adapted to select and/or designate the rotational symmetry mask according to a pattern of pixel values in the block. The media encoder may be adapted to designate the rotational symmetry mask by identifying the pattern of pixel values in the block. Designation based on the pattern of pixel values produces two complementary portions in which pixels within each respective portion are similar to one another, for example, similar intensity and/or color.

The pattern of pixel values may be extracted from the block, for example, by image segmentation methods, such as methods for locating boundaries and/or edges, for example based on intensity thresholding, edge detection, or other suitable methods. The pattern of pixel value may include the direction of an identified line within the block, and/or a pattern of the line (or curve). The extracted pixel pattern may be matched to a certain symmetry mask, for example, based on a lowest cost function to identify the mask with the most similar pattern to the extracted pixel pattern, such as matching masks that have the same direction and/or pattern as the identified line of the block. Selection based on the pattern of pixel values produces two complementary portions in which pixels within each respective portion are similar to one another, for example, similar intensity and/or color.

Alternatively or additionally, the pattern of pixel values is defined for two groups within the block, where the two groups satisfy the mirror symmetry criteria as described herein. Pixels or local regions within the block may be classified into one of the two groups based on the pattern of pixel values. For example, based on pixel color, pixel intensity, pixel characteristics and/or local visual patterns. One group may include a pixel pattern and/or other pixel characteristics based on the majority of pixels within the image and/or the respective portion, and the second group may include other pixels that do not fall into the first group.

Optionally, the pixel characteristic is based on the spatial correlation within the pixel's immediate neighborhood, for example, within a predefined window of size 3×3 around the pixel, or about 5×5, or other sizes. At least one portion of the two complementary portions may include pixels having high correlation to the immediate neighborhood (e.g., smooth area), for example, above a predefined correlation threshold value.

Optionally, the pixel characteristic is derived from a histogram of certain pixel feature (e.g., intensity level, color level, and spatial derivative direction). At least one portion of the two complementary portions may include pixels having pixel feature(s) in the same range of the certain pixel feature. For example, when the pixel feature is represented by the intensity level, and the range of the pixel feature is small, one portion of the two complementary portions may include pixels having similar intensity (e.g., smooth area). It is noted, that the shape of the portion may be arbitrary as long as the rotational symmetry property of the designated mask holds. Pixels which are not necessary spatially connected may be grouped when they share similar intensity. The media encoder adapted to designate a rotational symmetry mask which splits a block into homogenous region (even, for arbitrary shape of the two complementary portions) improves system performance by improving efficiency and/or reducing resource requirements (e.g., memory and/or processor) for compression of images and/or video.

For example, referring back to FIG. 4, the edge between the roof and the sky in block 404 is extracted based on an edge detection method. The detected edge is mapped to mask 402 based on a cost function. The pattern within mask 402 is the most similar pattern to the extracted edge, out of the mask library. Alternatively or additionally, pixels are classified as either having a purple color, or another color (i.e., red or white). Alternatively or additionally, pixels are classified as either having a low intensity (i.e., background sky), or high intensity (i.e. the roof).

Alternatively or additionally, at 914, the rotational symmetry mask is selected and/or designated based on an estimated rate measure indicative of a number of bits transmitted when the certain rotational mask is applied to an exemplary block having the size and/or shape of the block being processed. A lower number of bits represents a more efficient compression with the certain mask. Each one of the different rotational symmetry masks is associated with the estimated rate measure indicative of the number of bits transmitted when the mask is applied on an exemplary block having the size and the shape.

The rate measure may be stored with each mask, allowing for quick selection of the mask based on the estimated rate measure value. The rate measure may be calculated in advance for each mask, instead of being recalculated during run-time, thereby reducing the computations required for the selection. The rate measure may be calculated based on the exemplary block, which may be a predefined block based on an average (or other measure) of a previous sample of blocks. The exemplary block may be selected from a library of blocks based on a similarity to the block being processed, for example, based on a cost function.

Alternatively or additionally, at 916, the media encoder is adapted to select and/or designate the rotational symmetry mask based on a statistical classifier. The statistical classifier is generated by an analysis of a training set logging outcomes of applying at least some of the different rotational symmetry masks. The outcomes (which may be weighted) may include, for example, compression performance metrics (e.g., size, complexity, quality), processor resource utilization, and memory utilization. The statistical classifier may improve selection of the mask based on prediction of a result that includes multiple different desired outcomes.

The training set may be obtained based on a history of actual frames that were processed by the system. Alternatively, the training set may be obtained based on a prediction of types of frames that will be processed, for example, a nature channel may train a classifier with nature videos.

Outcomes of the classification may be used as inputs to further train and update the classifier.

The statistical classifier may be trained based on supervised learning and/or unsupervised learning methods.

The classifier may be applied to the block itself, to classify pixels within the block into one of two groups. The two groups may be divided based upon the rotational symmetry constraint of the rotationally symmetry mask. The mask is selected to match the arrangement of the two groups within the block. Each portion of the two complementary portions produces from the split of the block using the mask includes pixels from the respective group.

Alternatively or additionally, at 918, the media encoder is adapted to select and/or designate the rotational symmetry mask based on content extracted from spatial and/or temporal neighboring blocks of the block. The neighbors may be intra-image and/or inter-image blocks. Spatial blocks may be neighbors of the block in one or, several or all directions relative to the block. Temporal neighboring blocks may be from neighboring block in previous frames (e.g., earlier in time) and/or subsequent frames (e.g., later in time). The neighboring blocks may be direct neighbors, or located two or more blocks (or frames) away. Neighboring blocks containing similar pixel patterns used as predictors improve system performance and/or require fewer resources.

Optionally, the neighbors include previously processed blocks. The previously processed blocks may be used as predictors for selection of the mask for the block being currently processed. Optionally, the selection of the rotational symmetry mask is performed based on information associated with spatial and/or temporal neighboring blocks of the block. Optionally, the information associated with the spatial and/or temporal neighboring blocks is related to prediction. Optionally, the prediction is related to the direction mode of the intra predictor. The directions may be defined by the image compression standard, for example, HEVC. For example, the information includes data to reduce the difference between the current block being processed and one or more of the neighbors, with redundant information being left out. The mask may be selected based on the difference data. In another example, the information includes pixel intensity, pixel color, pixel characteristics and/or local visual patterns of the spatial and/or temporal blocks, which are similar (e.g., defined by a threshold) or the same as the intensity, color and/or visual patterns of regions of the block being processed.

Optionally, the content extracted is according to a pattern of pixel values in the spatial and/or temporal neighboring blocks. The content may be extracted based on pixel similarity between the spatial and/or temporal blocks and the block being processed, for example, based on similar colors, similar intensity, and/or similar local visual patterns. The similarity between the pixel patterns may be defined based on a similarity threshold, where pixels above the threshold are extracted and pixels below the threshold are not extracted.

Optionally, the pattern of pixel values in the spatial and/or temporal neighboring blocks is related to one or more edges of pixel values. The edges may be detected as described herein, for example, based on image segmentation, intensity changes, color changes, or other parameters. The prediction may be based on the edge itself, rather than, or in addition to, the rest of the pixels within the image.

The pixel pattern of the neighboring block may act as a predictor for selection of the mask in the currently block. For example, the pixel pattern includes a boundary and/or edge between a roof and sky (as discussed with reference to FIG. 4). The edge between the roof and the sky continues across several neighboring blocks. The edge between the roof and the sky may change intensity, color and/or spatial location within the frame, for example, as the camera sweeps across the scene, and/or as the lighting within the scene changes. Prediction of the edge between the roof and the sky may be based on similar edge patterns within the spatial and/or temporal neighboring blocks.

Encoding based on predictors improves system efficiency and/or utilizes fewer resources.

Referring now back to FIG. 1, at 106, the block is split to two complementary portions based on the rotational symmetry mask. Optionally, a block splitter module 212C contains program instructions for media encoder 202 to perform the block splitting as described herein.

At 108, a pair of rotational symmetry blocks, each having one of the two complementary portions is generated. Optionally, a pair generator module 212D contains program instructions for media encoder 202 to perform the pair generation as described herein.

The media encoder is adapted to generate each member of the pair of rotational symmetry blocks based on one of the two complementary portions and another portion added to form a block having a size and/or shape of the block.

Optionally, the added portion is a 2D mirror of the portion, which the rotational symmetry block is constructed from.

Optionally, the added portion is a 2D mirror of the portion from which the rotational symmetry block is constructed, but added with negative sign. In this case the rotational symmetry block contains two anti-symmetric portions.

The media encoder may be adapted to generate each member of the pair of rotational symmetry blocks in a size and/or a shape of the block, by adding complementary data to each one of the two complementary portions. Optionally, the complementary data includes a predefined sequence, for example, all zeros. The addition of the complementary data allows processing of each respective portion as an entire block, which is processed more efficiently in block form than partial block form.

Optionally, the complementary data is a 2D mirror of the respective portion which the rotational symmetry block is constructed from by multiplication by zero (0), one (1), or minus one (−1). Every value in the complementary data set may generated by multiplied by the same value, for example, each value is multiplied by zero, by one (i.e., symmetry) or by minus one (i.e., anti-symmetry).

Optionally, the added portion includes padding with a predefined sequence, for example, all zeros.

Optionally, the added portion is generated based on a 180 degree rotation of the portion, which the rotational symmetry block is constructed from.

Optionally, the dimension of the added portion is based on the dimension of the complementary portion, for example, two dimensional.

Each member of the generated pair of rotational symmetry blocks is represented by a matrix having values 2D mirrored around a main diagonal or other cut-line pattern based on the selected mask.

At 110, one or more transform coefficients for one or both members of the pair of rotational symmetry blocks are computed. Optionally, transform coefficients are calculated for each one of the rotational symmetry blocks. Optionally, a coefficient calculation module 212E contains program instructions for media encoder 202 to perform the transform coefficient calculation as described herein.

Calculation of the transform coefficients may be performed based on one or more standard based calculation methods, based on one or more encoding techniques, and/or based on proprietary methods. An example of an encoding technique includes a two dimensional discrete cosine transform (DCT), which may be calculated, for example, based on two separable fast DCTs applied along each dimension, for example, when the rotational symmetry blocks are represented as matrices, the 2D-DCT may be calculated along the rows and then the columns, or along the columns and then along the rows. Other examples of transform methods include: 2D Discrete Sine Transform (DST), and other orthogonal and/or orthonormal transform scheme which maintain the mirroring condition, for example:

$$T_{p,q}(M-m-1,N-n-1)=(-1)^{(p+q)}T_{p,q}(m,n),$$

where, $\{T_{p,q}(m,n)\}$ is the 2D transformation basis; (m,n) is the pixel location, m=0, 1, ..., M−1; n=0, 1, ..., N−1; p and q are the spatial frequencies: p=0, 1, ..., M−1; q=0, 1, ..., N−1; p+q is either even or odd for the symmetry and anti-symmetry case, respectively.

An example of a standard based encoding technique is the HEVC and/or H.265 standard for integer transform and/or inverse transform.

Optionally, an orthogonal transform set of coefficients is calculated for each one of the two complementary portions when the 2D mirrored portion is added with a negative sign (i.e. anti-symmetry). The set for the symmetrical and anti-symmetrical transform functions for calculation of the transform coefficients may be different. When computing the transform coefficients, the respective symmetrical or anti-symmetrical transform function is used.

Optionally, the media encoder is adapted to code the transform coefficient(s) using one or more spatial predictors adapted to the respective portion of the rotational symmetry mask. The transform may be calculated for the predictive block, for a predictive vector, for a predictive error, and/or for a predictive residual. The prediction residual may be calculated for temporal and/or spatial blocks (i.e., inter and/or intra-image blocks) based on the difference between the portion in the rotational symmetry block being processed and the corresponding prediction block.

Optionally, the media encoder is adapted to code the transform coefficient(s) using one or more temporal predictors adapted to the respective portion of the rotational symmetry mask. Alternatively or additionally, the media encoder is adapted to code the transform coefficient(s) of each of the rotational symmetry blocks using a spatial predictor related to the respective corresponding portion. Alternatively or additionally, the media encoder is adapted to code the transform coefficient(s) of each of the pair of rotational symmetry blocks using a motion vector related to the respective corresponding portion. The motion vector may be used to calculate the temporal prediction.

It is noted that the transform coefficients may be calculated based on one method for all transform coefficients, different methods for different transform coefficients (or sets of transform coefficients), and/or a combination of methods.

Optionally, the media encoder is adapted to code the transform coefficient(s) using an entropy context model adapted to the rotational symmetry mask. The entropy context model may be defined based on knowledge of the selected mask, to encode the transform coefficients with lossless data compression, for example, based on Huffman coding and/or arithmetic coding. As the entropy characteristics of the mask are known to the encoder in advance, a simpler code may be calculated.

The entropy context model may be a proprietarily designed model, and/or a standard based model, for example, the Context Adaptive Binary Arithmetic Coding (CABAC) scheme, such as CABAC of H.265/HEVC, H.264/MPEG-4, or other standards.

At 112, the calculated transform coefficients are provided for further processing, storage and/or transmission. Optionally, an output input interface 214 coupled to media encoder 202 is adapted to provide calculated transform coefficients 216, as described herein.

Optionally, at 114, blocks 102-112 are repeated for other blocks within the frame. Blocks 102-112 may be repeated for other frames. It is noted that blocks of a certain frame may be processed in parallel.

Figure 10:
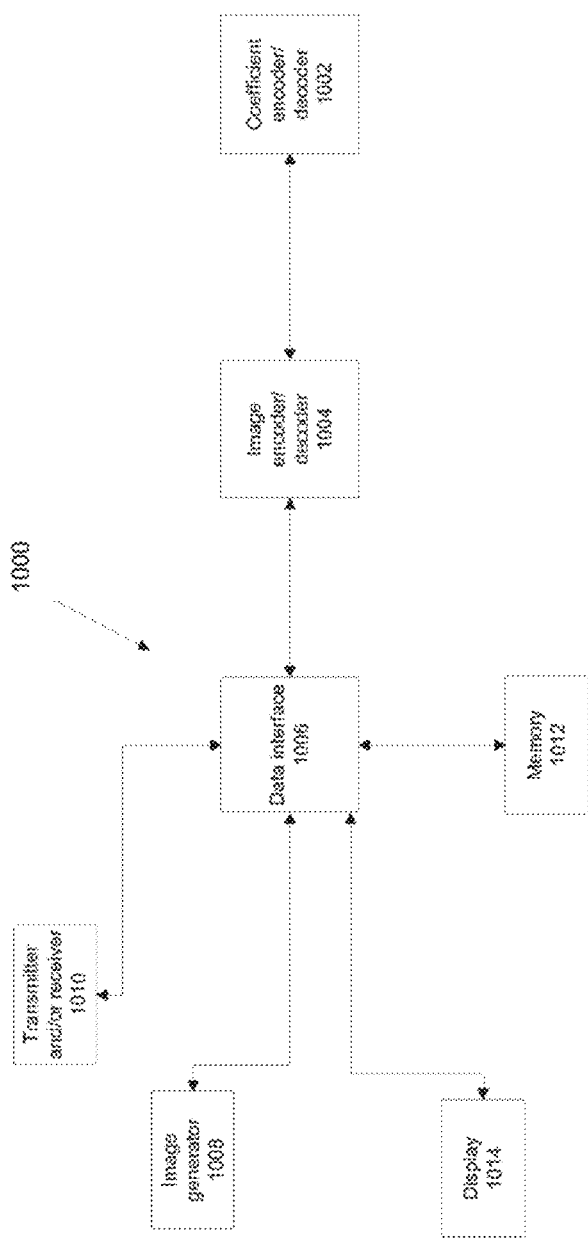
FIG. 10 is a block diagram of an exemplary system for image compression and decompression incorporating a coefficient encoder/decoder based on FIG. 1 and/or FIG. 2, in accordance with some embodiments of the present disclosure.

Reference is now made to FIG. 10, which is a block diagram of an exemplary system 1000 for image compression and decompression incorporating a coefficient encoder/decoder 1002, in accordance with some embodiments of the present disclosure. Encoder/decoder 1002 may include the transform part of media encoder 202 as described with reference to FIG. 2, a variant of encoder 202 (e.g., without processor 204, using the processor of another encoder/decoder), and/or another implementation of the method of FIG. 1. Integration of encoder 1002 within system 1000 improves coding efficiency of the images and/or video, which improves overall performance of system 1000, for example, by improving compression performance, by reducing processor resource requirements, transmitter/receiver requirements, and/or memory requirements. Integration of encoder 1002 within system 1000 allows for higher image quality, higher image resolution and/or a larger number of images to be processed using the same resources.

Coefficient encoder/decoder 1002 may be implemented within devices and/or systems associated with digital images and/or videos, for example, within a digital camera, within a television (e.g., high definition TV), within a digital camcorder, within a television broadcasting unit, within a Smartphone (or other mobile device), within a web-browser, within computer software to view and/or edit images and/or videos, within network devices (to improve network performance), within real-time conversation application (e.g., video chat, video conferencing, and telepresence systems). Implementation of encoder/decoder 1002 may improve performance of the device and/or system by reducing resource requirements (e.g., memory) for example, allowing more pictures and/or videos to be saved on a memory, allowing pictures and/or videos with higher quality and/or resolution to be saved, and lowering the size of each picture and/or video thus allowing for faster transmission of the picture and/or video over a network connection.

Encoder/decoder 1002 is integrated with an image encoder/decoder 1004 configured to encode and/or decode images and/or video by compression and/or decompression. Encoder/decoder 1004 may be based on a standard (e.g., HVEC, MPEG-4, JPEG) and/or based on one or more proprietary protocols. Coefficient encoder/decoder 1002 may be integrated with image encoder/decoder 1004, for example, as a chip or other hardware element(s) that is integrated within the hardware of encoder/decoder 1004, as a chip or other hardware element that plugs into encoder/decoder 1004, as external software modules, as software modules integrated within the code of encoder/decoder 1004, and/or combinations thereof.

Image encoder/decoder 1004 may include encoding and/or decoding components, for example, one or more of: quantization (e.g., by a quantization module), coefficient scanning (e.g., by a coefficient scanning module), entropy coding (e.g., by an entropy coding module), intra and/or inter image predictions (e.g., by a prediction module).

System 1000 includes a data interface 1006 coupled to image encoder/decoder 1004, configured to receive one or more images, for example, from an image generator 1008, from a transmitter/receiver 1010 (e.g., network interface, television cable, wireless transceiver), and/or from a memory 1012 storing images thereon.

The received images are processed by image encoder/decoder 1004, with transform coefficients being generated for one or more blocks of one or more image frames as described with reference to FIG. 1 and/or FIG. 2.

The compressed images may be stored on memory 1012, and/or transmitted using transmitter/receiver 1010.

When decoding, images may be retrieved from storage on memory 1012, and/or received from transmitter/receiver 1010. Decoding occurs by image encoder/decoder 1004, with decoding of transform coefficients by coefficient encoder/decoder 1002 as described herein. The decoded image may be displayed on a display 1014, transmitted by transmitter receiver 1010, and/or stored on memory 1012.

Figure 11:
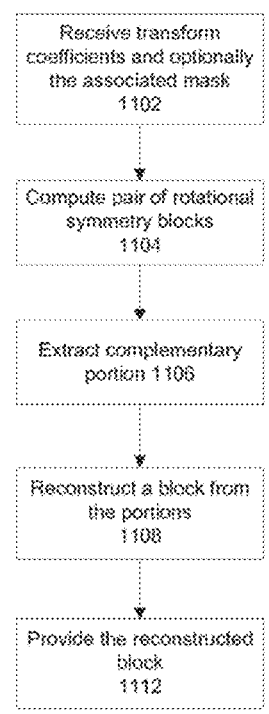
FIG. 11 is a flowchart of a method for decoding a set of transform coefficients coding a block in a frame, in accordance with some embodiments of the present disclosure.

Reference is now made to FIG. 11, which is a flowchart of a method for reconstructing a block in a frame from a set of transform coefficients, in accordance with some embodiments of the present disclosure. The method of FIG. 11 is based on, and complementary to the method of FIG. 1. The method of FIG. 1 depicts transforming a block, which is inverse transform based on the method of FIG. 11. The method of FIG. 11 may be performed by the transform part 202 of FIG. 2 of a media encoder configured to act as an inverse transform part of a media decoder. The inverse transform may be performed by the respective transform modules, and/or by other modules configured to perform one or more of the inverse transform processing components.

At 1102, a set of transform coefficient(s) representing one or more members of a pair of rotational symmetry blocks are received. Optionally, the transform coefficients represent the data of a block in the frequency domain.

It is noted that in some cases, one or more rotational symmetry blocks without any coefficients may be received, and/or not received (e.g., the blocks without coefficients may be skipped), for example, a signal representing no transform coefficients representing rotational symmetry blocks may be received. Alternatively or additionally, it is noted that in some cases, only one coefficient is received for the entire block (e.g., the DC coefficient).

A signal representing an associated selected rotational symmetry mask may be received or assumed to be known when it not received deliberately (e.g., the mask is deduced from the direction of the predictor). The rotational symmetry mask defines a rotational symmetry in a multi-dimensional space having the size and/or shape as the decoded block of a frame. Optionally, signals represents a certain rotational symmetry mask from multiple rotational symmetry masks which define multiple different rotational symmetries.

At 1104, the pair of rotational symmetry blocks are computed based on the inverse transform of the received set of transform coefficients. Each member of the pair of rotational symmetry blocks includes one of two complementary portions.

At 1106, each portion of the two complementary portions is extracted from each respective member of the pair of rotational symmetry blocks.

At 1108, a block is reconstructed from the two complementary portions. The reconstruction may be guided based on the rotational symmetry mask. Alternatively, block is reconstructed from the portions without the mask, guided based on forming a square or rectangular block, for example, fitting the two portions together like puzzle pieces.

Optionally, the block is designated within the frame.

At 1112, the decoded block is provided for further processing, storage, and/or is transmitted. The frame may be reconstructed from the reconstructed blocks. The frame may be displayed on a screen, for example, as part of a video.

Reference is now made to FIGS. 12A-12I, which include an image and graphs of experimental results of executing the methods and/or systems described herein. The graphs demonstrate improvement in performance using the systems and/or methods described herein, relative to image compression using methods based on compression standards. The experiments are based on individual frames using intra-frame coding methods.

The experiments are performed as follows:

One frame from each YUV video sequence is obtained. Various frame sizes are used, as defined by different standards, including: common intermediate format (CIF), quarter-CIF (QCIF), and high definition (HD). Each frame is partitioned uniformly into blocks of a fixed N×N size, including sizes of 8×8, 16×16, and 32×32 pixels.

A rotational symmetry mask library containing 2×(N−1) different line orientations is generated for mask selection and application.

Integer transformation, scaling, and quantization schemes are applied, based on the H.265 standard.

Coefficient scanning is performed by subdividing the N×N matrix of transform coefficients into 4×4 sub matrices of transform coefficients. Coefficient scanning is performed using a zig-zag scan in each 4×4 matrix while skipping the zero coefficients.

Transform coefficients are coded based on the H.264 CAVLC standard, which also defined signals for the prediction mode, the mask type and the MBtype (defined herein as the encoded block that was selected (i.e., the standard N×N block or block split into the two complementary portions as described herein).

Block intra-prediction for the N×N blocks is based on four modes; vertical (V), horizontal (H), DC (i.e., flat) (D) and plane (P). Coding members of the pair of rotational symmetry blocks is based on separate and/or common intra-predictors. The common intra-predictors include the 4 intra modes; V, H, D, and P. The separate intra-predictors include the 16 intra modes based on permutations of combinations of the 4 intra modes; VV, VH, . . . , and PP.

The decision of whether to encode a certain block based on standard N×N encoding methods, or to apply a rotational symmetry mask and encode the pair of rotational symmetry blocks (as described herein) was based on a rate distortion (RD) cost function defined as: SSE+lambda*Bits, where: SSE denotes the sum of square error between the reconstructed block and the input block, lambda denotes a term dependent on a quantization parameter (Qp), and Bits denotes the number of encoded bits in the block including the signaling bits. The encoding decision is also made based on the Percentage of Non-Zero coefficients (represented in the graphs by PerNZ Coeff).

The results are summarized as follows:

A reduction in bit rate of up to 15% for the same PSNR is shown. For 35 QCIF sequence frames, divided into blocks of size 16×16, an average reduction of about 7% in bit rate for a PSNR range of 35-45 dB was achieved. For 10 larger size sequence frames, divided into blocks of size 16×16, an average reduction of about 7.5% was achieved.

Figure 12A:
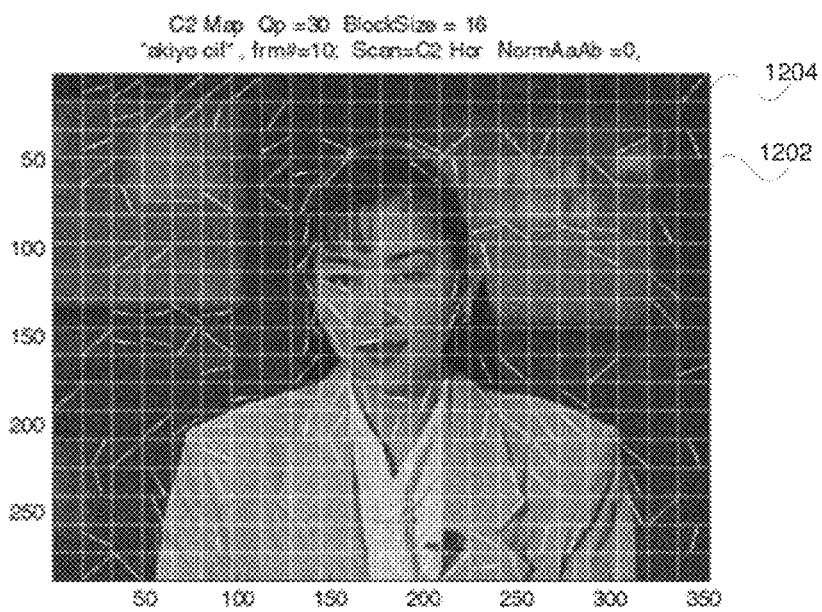
FIGS. 12A-12I includes an image and graphs of experimental results of executing the methods and/or systems described herein.

FIG. 12A is an exemplary of an image (i.e., frame) being processed in accordance with systems and/or methods described herein as part of the experiment described herein. The image corresponds to the $10^{th}$ frame of a CIF sequence name akiyo.cif. The CIF frame has a size 352×288 pixels. The frame is partitioned uniformly into blocks based on square N×N blocks, where N=16 pixels (an example block is depicted by 1202). The frame is encoded using Qp=30. A rotational symmetry mask library containing 2(N−1)=30 different line orientations provides a basis for selection of masks for splitting the block. Blocks having associated selected masks with line orientation are depicted in the figures, for example, block with mask 1204. In many cases, the mask line follows the edge within the block. Blocks for which no mask was selected were encoded as a single N×N block, and depicted in the image without the mask, for example, block 1202.

The graphs of FIGS. 12B-I include experimental results based on the processing of FIG. 12A.

Figure 12B:
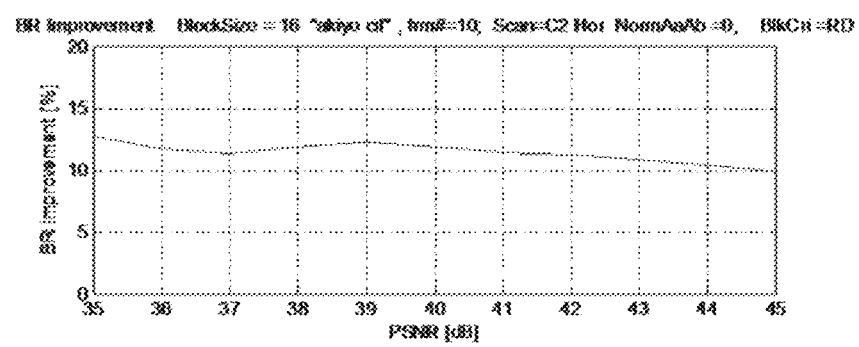

FIG. 12B is a graph depicting improvement in terms of bit rate for the entire frame of FIG. 12A when masks are selected to split the block into two complementary portions for encoding, over the encoding image of FIG. 12A using standard N×N transformation blocks, at the same objective quality level (represented by PSNR). The graph depicts the percent of bit rate improvement as a function of PSNR. It is noted that an improvement in bit-rate of over 10% was achieved for the image of FIG. 12A using the systems and/or methods described herein.

Figure 12C:
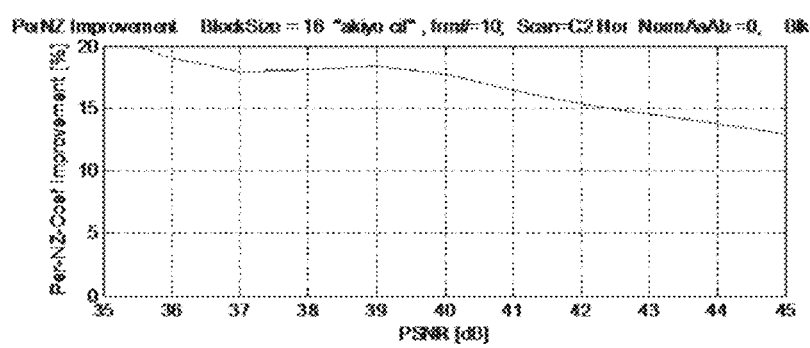

FIG. 12C is a graph depicting improvement in terms of per non-zero (PerNZ) coefficients for the entire frame of FIG. 12A when masks are selected to split the block into two complementary portions for encoding, over the encoding image of FIG. 12A using standard N×N transformation blocks, at the same objective quality level (represented by PSNR). The number of transform coefficients that are non-zero after quantization are used to estimate the number of encoded bits for coding the transform coefficients. It is noted that the non-zero coefficient measure does not include the overhead of signaling bits (e.g., prediction mode, mask selection mode, and MB type). The graph demonstrates improvement in terms of percentage of non-zero transform coefficients of about 15% using the systems and/or methods described herein.

Figure 12D:
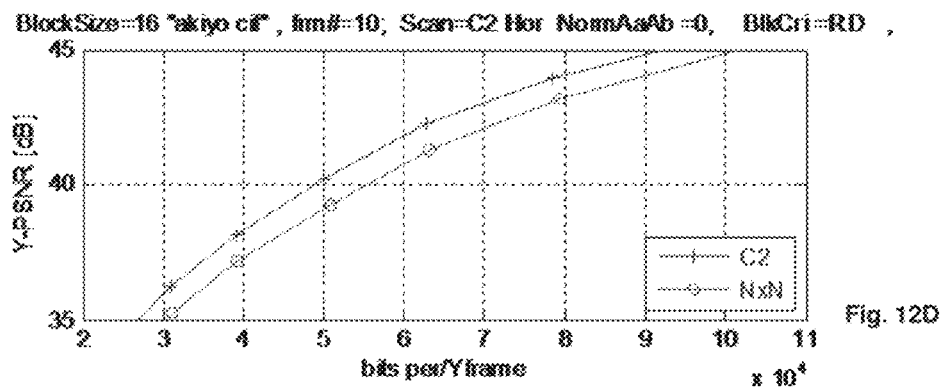

FIG. 12D is a graph depicting Y-PSNR as a function of bit rate, for the C2 processing scheme and for the N×N processing scheme. The C2 processing scheme is the methods and/or systems described herein based on either mask selection and generation of the two complementary portions for the transformation block, or encoding the N×N block using standard methods. The selection of the mask based encoding or the N×N block based encoding is based on a certain measure which is associated with each mask based partition and each N×N block. The N×N processing scheme is based on the standard method of encoding each block as a single N×N block. The graph demonstrates that the C2 method achieved a lower bit rate than the N×N method, for the same PSNR value, which represents improved quality for the same bit rate.

Figure 12E:
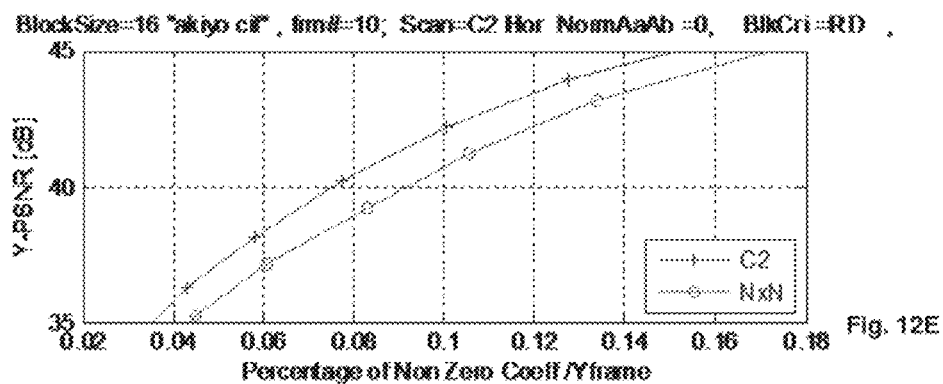

FIG. 12E is a graph depicting Y-PSNR as a function of the percent of non-zero transform coefficients for the entire frame, based on the C2 method and the N×N method. The graph depicts improved compression performance based on the C2 method (i.e., the systems and/or methods described herein), in terms of lower percentage of non-zero transform coefficients for the same PSNR, which represents improved quality for the same percentage of non-zero transform coefficients.

Figure 12F:
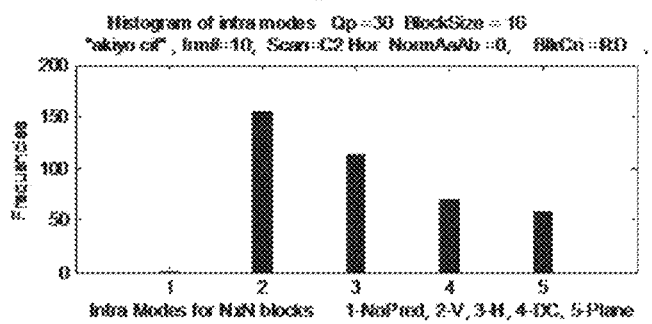

FIG. 12F is a histogram depicting frequency of application of the intra-prediction mode for the N×N standard case. On the x-axis, 1 denotes no prediction, 2 denotes vertical prediction, 3 denotes horizontal prediction, 4 denotes DC prediction, and 5 denotes plane prediction.

Figure 12G:
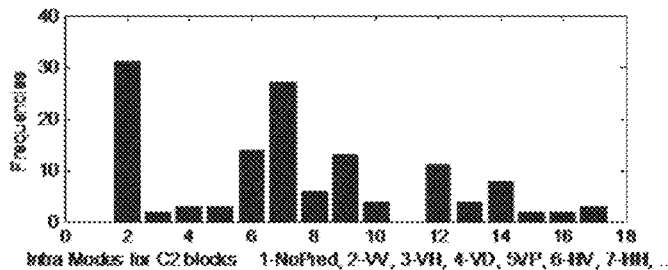

FIG. 12G is a histogram depicting frequency of application of the intra-prediction mode for the C2 scheme of the methods and/or systems described herein, for 16 separate predictor modes: 1 denotes no prediction, 2 denotes VV prediction, 3 denotes VH prediction, 4 denotes VD prediction, 5 denotes VP prediction, 6 denotes HV prediction, . . . , 17 denotes PP prediction.

Figure 12H:
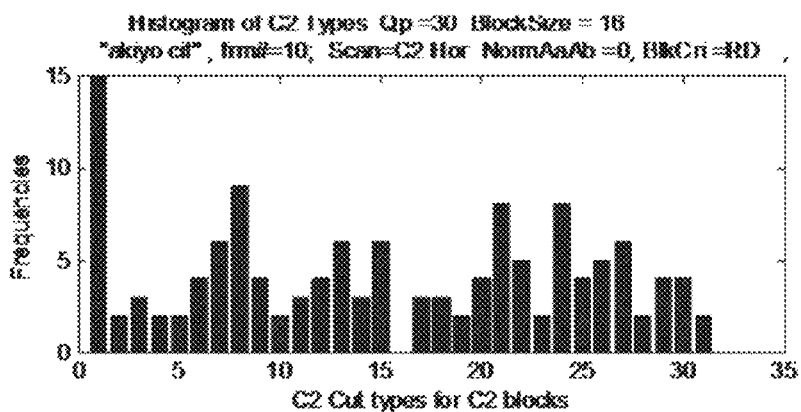

FIG. 12H is a histogram depicting frequency of application of each mask of the library of 30 rotational symmetry masks.

Figure 12I:
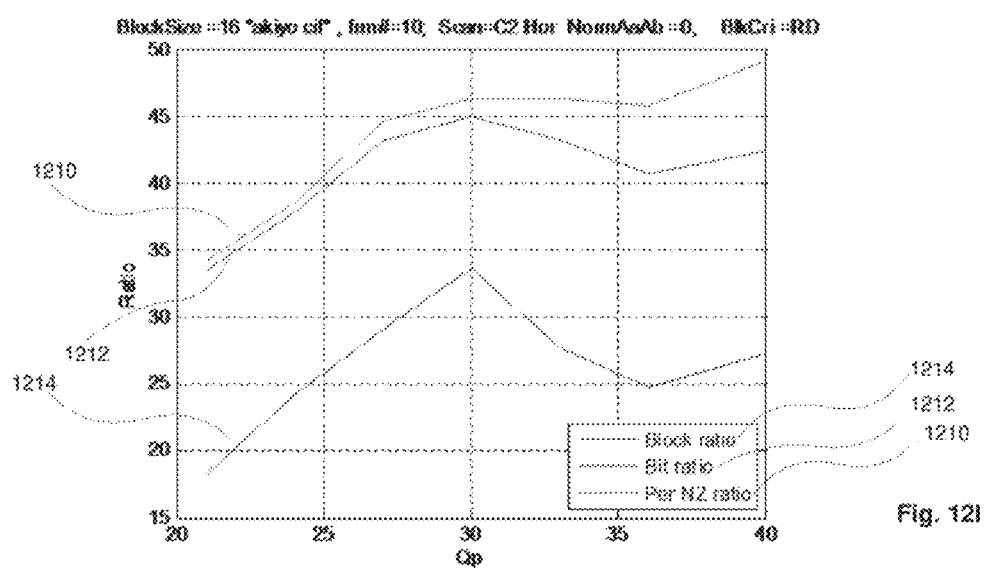

FIG. 12I is a graph depicting the ratio of three variables as a function of Qp.

Line 1214 denotes the percentage of blocks for which the C2 method was selected over the standard N×N method for the blocks of the image. For example, at Qp=30, about 35% of the blocks in the frame were encoded based on the C2 method (based on mask selection and encoding of the two complementary portions), while the remaining (about 65%) were encoded as a single 16×16 block.

Line 1212 denotes the percentage of bits of the frame that were encoded based on the C2 method. For example, at Qp=30, about 45% of the bits in the frame were encoded based on the C2 method.

Line 1210 denotes the percentage of per non-zero transform coefficients of the frame that were encoded using the C2 method. For example, at Qp=30, over 45% of the per non-zero transform coefficients in the frame were encoded using the C2 method.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant image encoders and/or image decoders will be developed and the scope of the term encoder is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. An apparatus for generating a set of transform coefficients of a block in a frame, series of frames, or portion thereof, the apparatus comprising:
    a media encoder coupled to a data interface adapted to receive a frame, series of frames, or portion thereof, wherein the media encoder is configured to:
    identify one or more predictors in the frame, series of frames, or portion thereof;
    designate a rotational symmetry mask, based on the one or more predictors, and having a size and a shape as the block partitioned in the frame, series of frames, or portion thereof for processing the block;
    split the block to two complementary portions using the rotational symmetry mask;
    generate a pair of rotational symmetry blocks each having one of the two complementary portions; and
    compute a transform coefficient for each member of the pair of rotational symmetry blocks.

2. The apparatus of claim 1, wherein the media encoder is configured to generate each pair of rotational symmetry blocks in a size and a shape of the block by adding complementary data to the respective portion of one of the two complementary portions.

3. The apparatus of claim 2, wherein the complementary data is a two-dimensional (2D) mirror of the respective portion which the rotational symmetry block is constructed from by multiplication by one member of the group consisting of: zero (0), one (1) and minus one (−1).

4. The apparatus of claim 1, wherein:
    the data interface is further configured to receive at least one transform coefficient representing at least one member of a pair of rotational symmetry blocks, the transform coefficients coding a block in a frame or portion thereof, and a signal representing an associated designated rotation symmetry mask having a size and a shape as the block partitioned in the frame or portion thereof for processing the block; and
    the media encoder is further configured to:
    compute the pair of rotational symmetry blocks based on inverse transform of the received at least one transform coefficient, each member of the pair of rotational symmetry blocks having one of two complementary portions, and
    reconstruct a block partitioned in same frame or portion thereof from the two complementary portions based on the rotational symmetry mask.

5. A method for generating a set of coefficients of a block in a frame, series of frames, or portion thereof, the method comprising:
    identifying one or more predictors in the frame, series of frames, or portion thereof;
    designating, based on the identified one or more predictors in the frame, series of frames, or portion thereof, a rotational symmetry mask having a size and a shape as a block partitioned in the frame or portion thereof for processing the block;
splitting the block to two complementary portions using the rotational symmetry mask;
generating a pair of rotational symmetry blocks each having one of the two complementary portions; and
computing a transform coefficient for each member of the pair of rotational symmetry blocks.

6. The method of claim 5, wherein the rotation symmetry mask is designated from a plurality of rotation symmetry masks which define a plurality of different rotational symmetries.

7. The method of claim 1 wherein the content is extracted according to a pattern of pixel values in at least one of the spatial and temporal neighboring blocks.

8. The method of claim 1 wherein the information associated with at least one of spatial and temporal neighboring blocks is related to prediction.

9. The method of claim 8 wherein the prediction is related to the direction mode of an intra predictor.

10. The method of claim 5, wherein computing the transform coefficient is based on a two dimensional (2D) Discrete Orthogonal Transform which maintains the rotational symmetry condition calculated by the equation:

$$T_{p,q}(M-m-1,N-n-1)=(-1)^{(p+q)}T_{p,q}(m,n),$$

Wherein:
$\{T_{p,q}(m,n)\}$ denotes the 2D transformation basis;
(m,n) denotes a pixel location; and
m=0, 1, ..., M−1; n=0, 1, ..., N−1; p and q denote the spatial frequencies: p=0, 1, ..., M−1; q=0, 1, ..., N−1.

11. A method for reconstructing a block of a frame or portion thereof based on a set of transform coefficients, the method comprising:
receiving a set of transform coefficients representing each member of a pair of rotational symmetry blocks, the transform coefficients representing data of a block in the frequency domain;
receiving a signal representing one or more predictors used to designate an associated rotation symmetry mask, the rotational symmetry mask having a size and a shape as the block partitioned in the frame or portion thereof for processing the block;
determining, based on the signal representing the one or more predictors, the rotational symmetry mask;
computing the pair of rotational symmetry blocks based on inverse transform of the received set of transform coefficient, each member of the pair of rotational symmetry blocks having one of two complementary portions; and
reconstructing the block from the two complementary portions based on the rotational symmetry mask.

12. An apparatus for decoding a block in a frame or portion thereof, the apparatus comprising:
a media decoder coupled to a data interface and configured to:
receive at least one transform coefficient representing at least one member of a pair of rotational symmetry blocks, the transform coefficients coding a block in a frame or portion thereof;
receive a signal representing or one or more predictors used to designate an associated rotation symmetry mask having a size and a shape as the block partitioned in the frame or portion thereof for processing the block;
determine, based on the signal representing one or more predictors used to designate an associated rotational symmetry mask, the associated rotational symmetry mask;
compute the pair of rotational symmetry blocks based on inverse transform of the received at least one transform coefficient, each member of the pair of rotational symmetry blocks having one of two complementary portions; and
reconstruct a block partitioned in same frame or portion thereof from the two complementary portions based on the rotational symmetry mask.

13. A method for reconstructing a block of a frame or portion thereof based on a set of transform coefficients, the method comprising:
receiving a set of transform coefficients representing each member of a pair of rotational symmetry blocks, the transform coefficients represent the data of a block in the frequency domain;
receiving a signal representing or one or more predictors used to designate an associated rotation symmetry mask having a size and a shape as the block partitioned in the frame or portion thereof for processing the block;
determine, based on the signal representing one or more predictors used to designate an associated rotational symmetry mask, the associated rotational symmetry mask;
computing the pair of rotational symmetry blocks based on inverse transform of the received set of transform coefficient, each member of the pair of rotational symmetry blocks having one of two complementary portions; and
reconstructing the block from the two complementary portions based on the rotational symmetry mask.

* * * * *